United States Patent [19]
Hawkins et al.

[11] Patent Number: 6,029,146
[45] Date of Patent: Feb. 22, 2000

[54] METHOD AND APPARATUS FOR TRADING SECURITIES ELECTRONICALLY

[75] Inventors: John G. Hawkins, Westfield; Dave M. Jacobs, Wayne; Rick Fitzpatrick, Rockaway, all of N.J.

[73] Assignee: Crossmar, Inc., New York, N.Y.

[21] Appl. No.: 08/700,836

[22] Filed: Aug. 21, 1996

[51] Int. Cl.[7] .................................................. G06F 17/60
[52] U.S. Cl. .......................... 705/35; 235/379; 705/37; 709/203
[58] Field of Search ....................... 235/379; 395/200.33; 705/30, 35, 37; 709/203

[56] References Cited

U.S. PATENT DOCUMENTS

| | | | |
|---|---|---|---|
| 4,346,442 | 8/1982 | Musmanno | 364/408 |
| 4,376,978 | 3/1983 | Musmanno | 361/408 |
| 4,571,463 | 2/1986 | Shefler | 179/90 B |
| 4,674,044 | 6/1987 | Kalmus et al. | 364/408 |
| 4,694,397 | 9/1987 | Grant et al. | 364/408 |
| 4,774,663 | 9/1988 | Musmanno et al. | 364/408 |
| 4,823,265 | 4/1989 | Nelson | 364/408 |
| 4,903,201 | 2/1990 | Wagner | 705/37 |
| 4,949,248 | 8/1990 | Caro | 364/200 |
| 4,980,826 | 12/1990 | Wagner | 364/408 |
| 5,038,284 | 8/1991 | Kramer | 705/37 |
| 5,077,665 | 12/1991 | Silverman et al. | 705/37 |
| 5,101,353 | 3/1992 | Lupien et al. | 364/408 |
| 5,136,501 | 8/1992 | Silverman et al. | 364/408 |
| 5,168,446 | 12/1992 | Wiseman | 705/37 |
| 5,220,501 | 6/1993 | Lawlor et al. | 364/408 |
| 5,262,942 | 11/1993 | Earle | 364/408 |
| 5,285,383 | 2/1994 | Lindsey et al. | 364/408 |
| 5,497,317 | 3/1996 | Hawkins et al. | 364/408 |
| 5,517,406 | 5/1996 | Harris et al. | 705/30 |
| 5,787,402 | 7/1998 | Potter et al. | 705/37 |

OTHER PUBLICATIONS

DSH; Trading & Execution—Citibank's custody and brokerage sandwich; Global Custodian Magazine; Winter—1995.

*Primary Examiner*—Edward R. Cosimano
*Attorney, Agent, or Firm*—Kilpatrick Stockton LLP; George T. Marcou; James J. Bindseil

[57] ABSTRACT

The Broker to Broker Matching Electronic Trading Confirmation system confirms and settles trade orders placed between brokers from various regions of the world. It automatically matches the originating broker's orders with the executing broker's confirmations, generates and sends settlement instructions to the broker's corresponding clearing agents, and allows those clearing agents to monitor orders before the orders are executed, minimizing risk and improving settlement rates.

38 Claims, 23 Drawing Sheets

| | Charges | | |
|---|---|---|---|
| Comission: | 641 | Soft Dollar: | 651 |
| Broker Comission: | 642 | Tax: | 652 |
| Shared Comission: | 643 | Transfer Tax: | 653 |
| Stamp Duty: | 644 | Payment Levy: | 654 |
| Transaction Tax: | 645 | SEC Fees: | 655 |
| Value Added Tax: | 646 | Matching Fee: | 656 |
| Withholding Tax: | 647 | Local Tax: | 657 |
| Postage: | 648 | Country Tax: | 658 |
| Shipping: | 649 | Other: | 663 |

Narrative:

Currency 659

Total Charges .00

Clear　　　　OK

638

FIG. 21

METHOD AND APPARATUS FOR TRADING SECURITIES ELECTRONICALLY

BACKGROUND OF THE INVENTION

The present invention relates generally to methods and devices for electronically trading securities and more particularly to a method and device for electronically trading securities between brokers in which trade confirmation is performed automatically.

The torrid pace of evolution in the securities market continues to intensify. Many investors, such as pension funds, are constantly seeking greater returns on their assets and are looking to emerging markets to meet this requirement. Consequently there is an ever increasing movement of funds into and out of international securities.

Concurrent with this explosion in cross-border trading, financial institutions are being confronted with shortening settlement cycles, increased competition in the global market place, and rapid advances in technology. To meet these challenges and improve profitability, financial institutions will need to re-engineer business processes to increase efficiency, automate to reduce costs and expedite settlement, and move towards proactive risk management.

One area in need of an improvement in efficiency is broker to broker trade confirmations. This is a business process for confirming and settling trade orders placed between brokers from various regions of the world. Today, institutional investors routinely make cross border trades in blocks in excess of 100,000 shares. In the near future, these numbers may double or even triple. Unfortunately, settlement failures for cross border trades has been estimated at as much as 30%. For the large block cross border trades, this failure rate is extremely costly. These costs may actually limit the sizes of cross border block trades in certain circumstances.

Language barriers, time differences and physical distance combined with short settlement periods increases the risks for all security trading participants. While the current suite of electronic trading products have reduced the risk for the investor and the executing broker by automating the confirmation process, none of the products has provided an efficient method for routing settlement instructions to agent banks. Banks are forced to rely on a variety of manual methods for receiving settlement instructions from their counterparties. These settlement instructions are often received by the bank after the trade is supposed to settle and often contain multiple errors. Banks are required to employ large staffs to chase down settlement instructions, repair messages and to manually match settlement instructions with executing brokers' instructions prior to settlement taking place.

An example of the way these types of transactions occur today is as follows. Company A, Hong Kong, places an order with Company B, Philippines to purchase 1,000 shares of Securities C. To place the order, the originating broker at Company A telephones and faxes to Company B. Upon receiving the order, an executing broker at Company B executes the trade at the Makati Stock Exchange on Company A's behalf. Typically at the end of the day, Company B notifies Company A, Hong Kong that the trade has been successfully executed. The notification is followed by a fax transmission to the brokers' custodian and clearing agent where the actual fund and security transfer will take place. The entire process could take somewhere between a day and up to several days.

As evident from the above example, this process flows though several stages and tends to be time consuming and error prone. This problem is particularly acute when trading across wide time zone gaps, leaving tight datelines for settling trades and correcting any errors. For institutional money managers, brokers and banks, carrying unconfirmed trades on their books increases risk. Thus, delays in achieving confirmation are costly to financial institutions reducing the profit margin on these transactions.

Systems exist that permit securities traders to communicate electronically with each other. Each of these systems require the investor's clearing agent to manually pre-match a settlement instruction with the executing broker. Currently, there are no products that can effectively automate the trading confirmation process between brokers.

The Depository Trust Company's ID system is used in the United States between institutional investors and broker dealers to confirm transactions for DTC eligible U.S. securities. This system does not operate on a central matching basis; institutions must wait for broker dealers to submit trade data for which they must provide an affirmation. For no DTC eligible securities, the institution must send a message to its clearing agent notifying them of a securities transaction. The institution's clearing agent must manually pre-match the settlement instruction with the executing broker instructions before the actual settlement can occur.

Thomson Financial's OASYS Global service also allows institutions and brokers to confirm transactions. OASYS Global, however, does not offer centralized matching and does not automatically generate settlement instructions and route them over the Society for Worldwide Interbank Financial Telecommunications (SWIFT) Financial Network. Additionally, OASYS Global Message formats are not based on the SWIFT standards.

The London Stock Exchange SEQUAL product offers a centralized broker to broker matching facility, however, SEQUAL does not generate settlement instructions to clearing agents and its message structures are not based on SWIFT formats. Security participants also communicate settlement instructions to their clearing agents via telexes, faxes, telephone calls and independently via the SWIFT network.

U.S. Pat. No. 5,497,317 discloses a method for improving security trade settlements. FIGS. 1 and 2 depict the device and method 10 disclosed by this patent, in which trade settlement information is communicated securely between institutional investors 12, brokers 14 and custodians 16. As defined in this patent, institutional investors consists of retirement and pension funds, mutual fund companies, investment advisors, insurance companies and other investors, which manage and trade for two or more accounts. Custodian is defined as a bank, security depository or other settlement agent. In this system, brokers 14 and custodians input delivery instructions 32 to delivery database 30 along respective lines 31, 33 (FIG. 2). Delivery instructions are stored in database 30 in a format compatible with both IUG and ISITC standards. Referring to FIG. 1, the diagonal lines 20, 21, 22 represent communication links between security trading participants and a central database 24 (which actually consists of two separate databases), and between the participants themselves for exchanging messages, e.g. electronic mail, not relating to settlement of a particular trade. The horizontal and vertical lines 18 between institutions and brokers represent communication links utilized immediately after trade execution to settle the trade. Similarly, the horizontal and vertical lines 19 between institutions and custodians represent security trade settlement communication links. Referring to FIG. 2, brokers 14 and custodians 16 input delivery instructions 32 to delivery database 30 along respective lines 31, 33. The device and method disclosed in this patent is for settling trades, not placing orders, and thus no communication links are provided prior to trade execution. Referring again briefly to FIG. 1, after exchange of settlement information with brokers 14, institutions 12 use communication link 19 to inform custodians 16 of the trade and provide them with the trading brokers' delivery instructions for settlement. After affirming the brokers' confirmations for each allocation, institutions convert or reorganize the confirmations, which are in IUG format as necessary to put them in ISITC format and transmit the information as trade advice to custodians. This system, however, does not provide for direct broker to broker confirmation, in which a secure communication is maintained between the brokers. Furthermore, this system is not compatible with standard message formats in the SWIFT financial network.

The present invention is therefore directed to the problem of developing a system and method for direct broker to broker trading that will automatically match an investor's security order with an executing broker's match confirmation, but will be compatible with existing financial network standards.

SUMMARY OF THE INVENTION

The present invention solves this problem by providing a system and method for direct broker to broker trading that will automatically match an investor's security order with an executing broker's match confirmation and will automatically generate and route via the SWIFT Financial Network a settlement instruction to the investor's clearing agent. By allowing securities participants to match orders to executions in trade date and by automatically generating prematched settlement instructions to clearing agents on trade date, the system will increase the accuracy, reduce the cost, reduce the inherent financial risk and increase the rate of settlement for all security participants.

Furthermore, by basing the message structures on the SWIFT formats and by routing messages over the SWIFT Financial Network, banks will be able to receive and process messages in a reliable and efficient manner. The system will also allow an investor's clearing agent to monitor investor's orders prior to execution in order to minimize financial risk and improve settlement rates. Messages between all the participants will be based on the SWIFT Securities message formats.

The method of the present invention for electronically trading securities is compatible with the SWIFT Financial Network, and includes the steps of: transmitting an order message from an originating broker workstation to a host computer in a SWIFT format via a public network, the order message being directed to an executing broker to buy or sell securities; storing the order message from the originating broker in the host computer until the executing broker connects to the host and downloads the message; transmitting the order message from the host to the executing broker workstation when the executing broker connects to the host computer; presenting data regarding the order message to the executing broker in a combined order/confirmation SWIFT formatted message; transmitting a SWIFT confirmation message from the executing broker workstation to the host after the order has been executed on an executing exchange; matching the executing broker's confirmation message with the originating broker's message in the host computer; preparing and formatting a SWIFT notification message, which is either a deliver against payment or receive against payment SWIFT formatted message in the host computer; and transmitting the notification message to the originating broker's clearing agent.

Additional advantageous steps of the method according to the present invention include: transmitting a copy of the notification message to the executing broker, and transmitting the confirmation message to the originating broker. This permits the executing broker to review the system notification messages for errors.

According to one advantageous implementation of the method of the present invention standing delivery instructions are stored in a broker delivery instruction database in the host, which database is accessible by both the originating and executing brokers, and the standing delivery instructions are automatically appended to the originating broker's order message when it is passed to the host. In this case, the originating broker can override the standing delivery instructions in the database by entering settlement data directly on the SWIFT order message. In addition, the executing broker's confirmation is matched with the originating broker's original order, and an order is prepared upon direction of the broker to match the executing broker's confirmation if the originating broker contacted the executing broker by some means independent of the system. All notification messages are time stamped when the transaction was matched, and stored until the originating broker's clearing agent or the executing broker's clearing agent logs into the host. The clearing agent is sent a message notification of the transaction when the clearing agent logs into the host, and a time stamp is applied as to the time of the download when the clearing agent downloads the notification message.

According to yet another advantageous implementation of the method of the present invention, the originating broker and the executing broker are permitted to directly enter settlement data on the SWIFT orders or the SWIFT confirmations, respectively. In addition, the system formats a notification message if the executing broker and the originating broker's messages match using data elements from the order and confirmation messages and standing delivery instructions, time stamps the notification message and stores it until the clearing agent logs into the host, at which time the system applies a time/date stamp confirming the time of download when sending the notification message, and forwards the confirmation message to the originating broker.

According to yet another advantageous implementation of the method of the present invention, the system automatically determines whether the order message was a buy or sell message and thus varies the type of notification message sent to the originating broker's clearing agent depending upon whether the originating broker's order was a buy or a sell order. In this case, the system constructs and sends a receive against payment message to the originating broker's clearing agent, constructs and sends a deliver against payment message to the executing broker and the executing broker's clearing agent if the message order was a buy order, constructs and sends a deliver against payment message for the originating broker's clearing agent, and constructs and sends a receive against payment message to the executing broker and the executing broker's clearing agent if the message order was a sell order.

A server for use in the system of the present invention, is coupled to the financial network for trading securities between brokers, and includes a database, a processor and a data communication device. The database stores standing delivery instructions relating to at least one broker. The data communication device receives an order message in a SWIFT format from a first broker and forwards the order message in the SWIFT format to a second broker, receives a confirmation message in SWIFT format from a second broker and forwards the confirmation messages in the SWIFT format to the first broker, forwards a first notification message in a SWIFT format to a first clearing agent, and forwards a second notification message in a SWIFT format to a second clearing agent. The processor is coupled to the data communication device and the database, and matches the order message with the confirmation message, prepares the first notification message in the SWIFT format using data elements from the order and confirmation messages and the stored standing delivery instructions, and prepares a second notification message in a SWIFT format using data elements from the order and confirmation messages and the stored standing delivery instructions.

A system according to the present invention for electronically trading securities, which system is compatible with the SWIFT Financial Network, includes a database, a server, broker workstations, and clearing agent workstations. The database stores standing delivery instructions relating to at least a first broker, a second broker, a first clearing agent and a second clearing agent. The server is as described above. The broker workstations includes a data communication device, and several graphical user interfaces. The data communication device is coupled to the data communication device in the server, and transmits and receives order messages in the SWIFT format, transmits and receives confirmation messages in the SWIFT format, and receives the notification messages in the SWIFT format. A first graphical user interface is included for permitting an originating broker to specify an order message to buy or sell securities and to direct said message to an executing broker. A second graphical user interface is included for permitting an executing broker to specify a confirmation message indicating that a particular order was executed and to direct the confirmation message to an originating broker. A third graphical user interface is included for permitting either the originating or executing broker to create and modify a set of standing delivery instructions. The clearing agent workstations are coupled to the server, and include a fourth graphical user interface for permitting the first or second clearing agents to connect to the server and download messages intended for them.

According to one advantageous embodiment of the system of the present invention, the first and second graphical user interfaces include formats for permitting a broker to override the standing delivery instructions.

According to another advantageous embodiment of the system of the present invention, the server matches the originating broker's order with the broker's standing delivery instructions stored in the standing delivery instructions database. In addition, if the originating broker contacted the executing broker outside the system, the workstation automatically writes an order to match the executing broker's confirmation, upon direction of the broker. Furthermore, the server notifies the originating broker if the executing broker's confirmation does not match the originating broker's original order, which allows the originating broker to visually compare and manually match the originating broker's order to the executing broker's confirmation.

According to another advantageous embodiment of the system of the present invention, the server develops a notification message that the transaction was completed if the executing broker's message matches the originating broker's message. In this case, the server time stamps the notification message when the transaction was matched and stores the notification message until the originating broker's clearing agent or the executing broker's clearing agent logs into the server.

According to another advantageous embodiment of the system of the present invention, the server further comprises means, when the clearing agent logs into the server, for sending the clearing agent a notification message of the transaction, and applying a time stamp as to the time of the download when the clearing agent downloads the message notification. In addition, the server further comprises means for receiving the message, means for stamping the message with a time code, means for assigning a reference number to the message and means for adding the originating broker's standing delivery instructions stored in the database.

According to another unique embodiment of the present invention, the server further comprises means for processing an order placed outside of the system, said outside processing means identifying the executing broker's order message, searching for an originating broker's order to match against the executing broker's confirmation message, and automatically generating a buy or sell order that matches the executing broker's confirmation under direction of the broker.

According to another advantageous embodiment of the system of the present invention, the first graphical user interface includes at least an order folder, which includes both mandatory and optional fields, the mandatory fields include quantity, reference number, instrument, creation date, time limit, price limit, security type, counter party and type of safekeeping, the optional fields include routing code, stop price, charges and override standing delivery instructions. The second graphical interface has at least an execution folder, which includes both mandatory and optional fields, the mandatory fields include quantity reference number, instrument, instrument, settlement amount, trade price, price type, security type, trade date, settle date, and counter party, the optional fields include charge tax, charge write, charge stamp and charge confirmation. The third graphical user interface has at least a settlement folder, which includes fields regarding settlement country, clearing agent, depository, address, account, safekeeping and wire instructions.

BRIEF DESCRIPTION OF THE DRAWINGS

FIG. 12 represents a main screen with an execution folder selected in the broker's computer in the system of the present invention.

FIG. 14 represents a main screen with a settlement instructions folder selected in the broker's computer in the system of the present invention.

FIG. 21 depicts the charges screen accessed through the main menu, execution folder screen used in the graphical user interface of the present invention.

DETAILED DESCRIPTION

Figure 1:
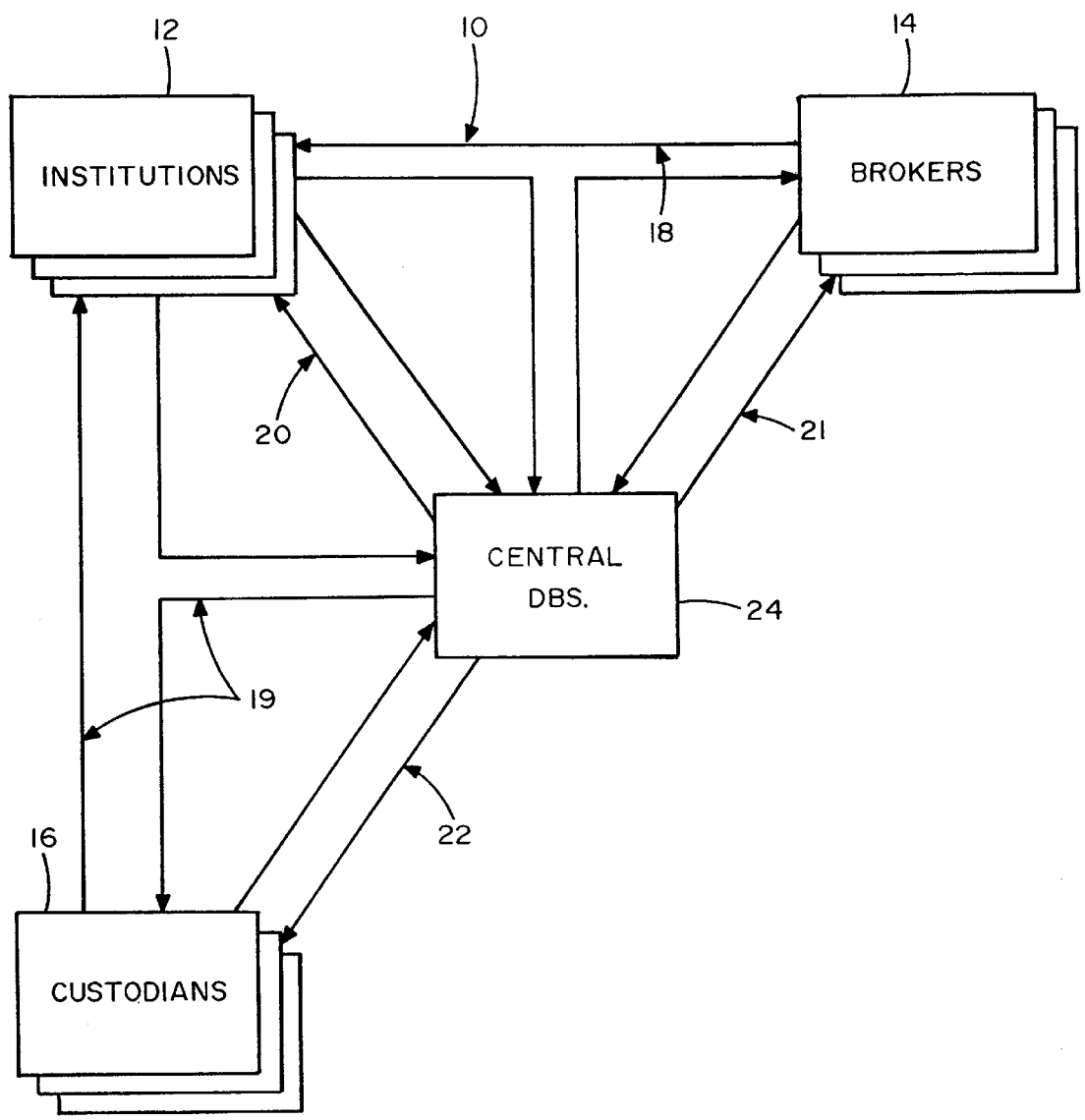
FIG. 1 is a block diagram of a prior art communication device for performing trade settlements between institutional investors, brokers and custodians.
Figure 2:
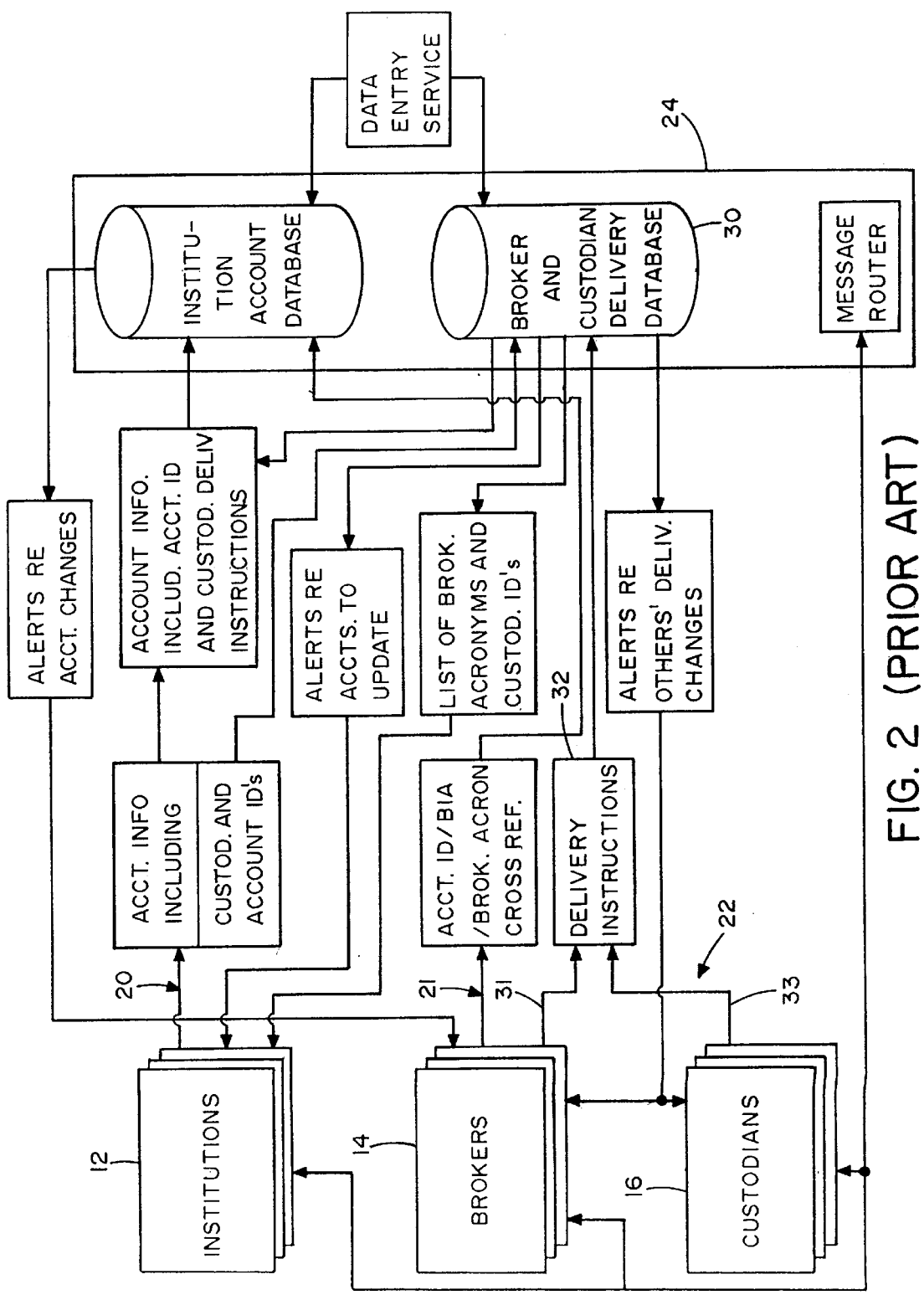
FIG. 2 is a block diagram of the database of the prior art communication device depicted in FIG. 1.
Figure 3:
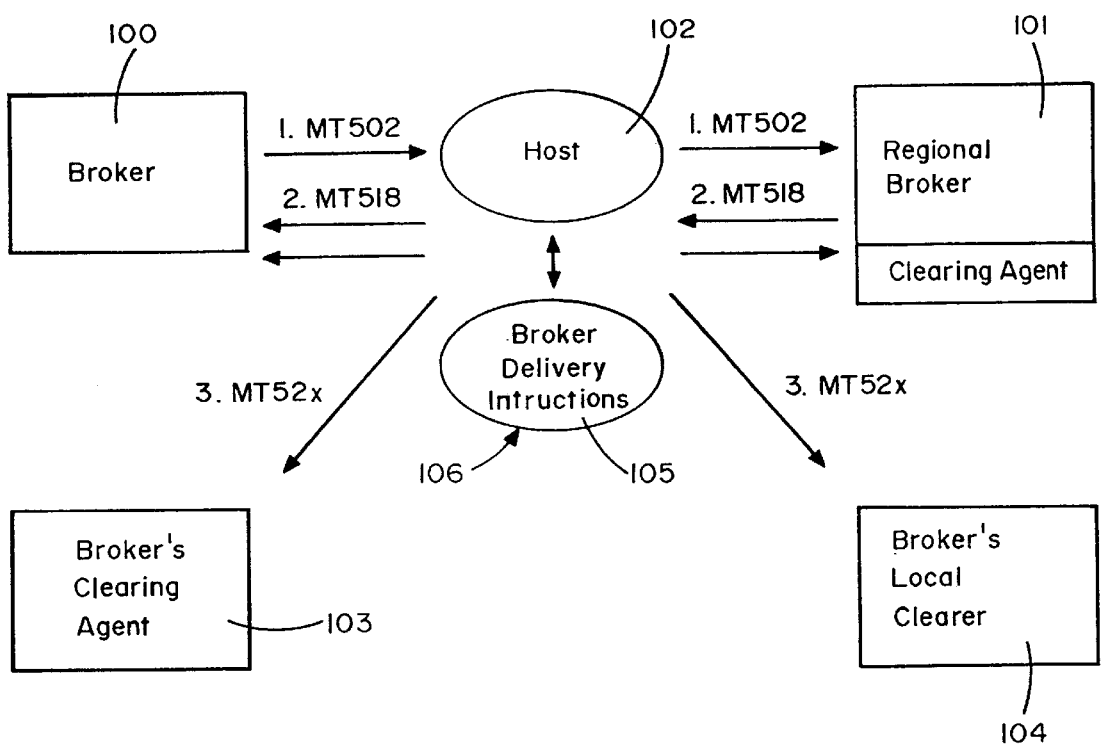
FIG. 3 depicts the message flow according to the method of the present invention for performing broker to broker trade confirmation.

Referring to FIG. 3, an originating broker 100 will transmit a message to an executing or regional broker 101 to buy or sell securities in the SWIFT MT502 format. The message will be transmitted from a user's workstation via the public data network (PDN) and will be stored on a host machine 102. The host 102 will store the message until the executing broker 101 manually connects to the host 102 and downloads the data. The data will then be presented to the regional broker 101 on his or her workstation in a combined MT502/MT5S18 format. After the order has been executed on the executing exchange, the broker 101 will enter the required data and transmit a SWIFT MT518 message to the host 102. The host 102 will then match the executing broker's MT518 message with the originating broker's MT502 message and construct a MT52x message. The SWIFT MT52x message will then be sent to the originating broker's clearing agent 103, and if necessary, to the originating broker's local clearing agent 104. The executing broker 101 will also receive a copy of the MT52x message. The originating broker 100 will also receive the MT518 message.

To facilitate the routing of messages, brokers will be able to input the standing delivery instructions 105 into a broker delivery instruction database 106 in the host 102. As the originating broker's order message is passed to the host 102, its standing delivery instructions 105 will be attached to the order message. By doing this, the broker's clearing agent 103 will be able to monitor the status of the transaction. The originating broker 100 will also be able to override the SDI 105 in the database 106 by entering settlement data on the MT502 order message.

Example Of A Transaction According To The Present Invention

Figure 4:
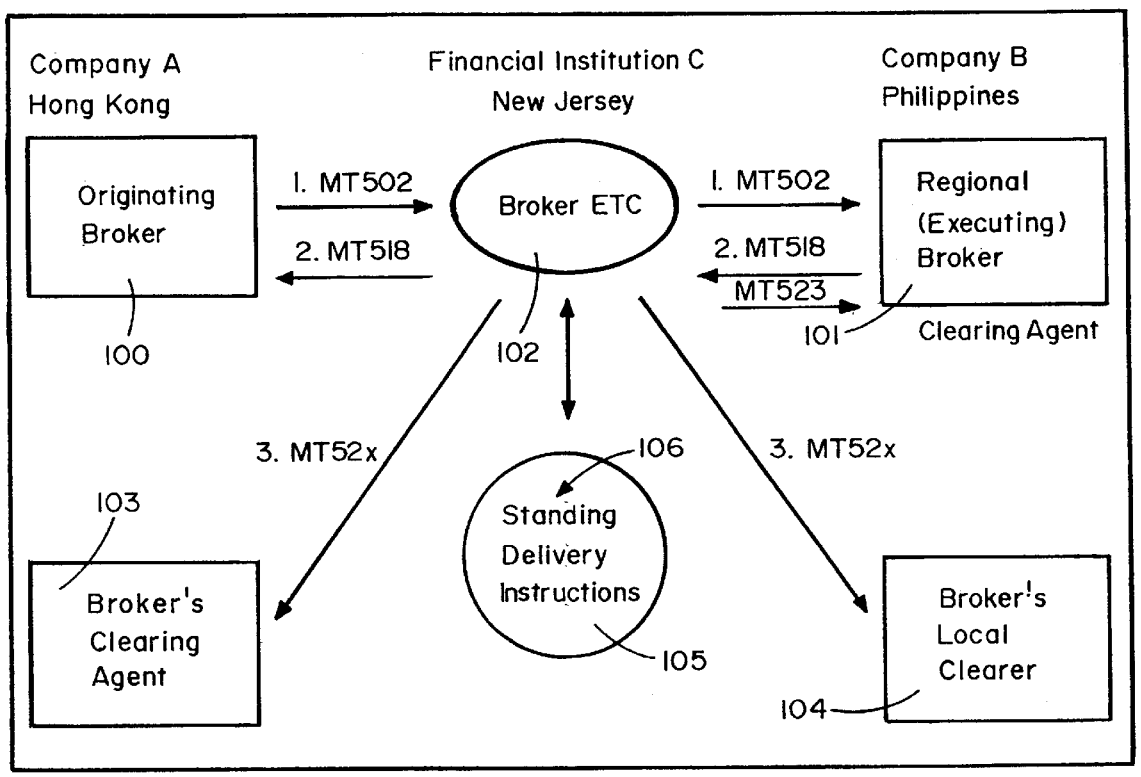
FIG. 4 depicts an example of a broker to broker transaction being performed according to the method of the present invention.

FIG. 4 depicts an example of a transaction being processed according to the present invention. For example, originating broker 100 (Company A in Hong Kong) places an order with executing broker 101 (Company B, in the Philippines) to purchase 1,000 shares of XYZ Securities. Company A will send an MT502 order to buy to the Host 102 (Financial Institution C). Company B will retrieve the message and after the order has been executed on the Makati Exchange, will send an MT518 message to the host 102. The host 102 will match the originating broker's MT502 with the executing broker's MT518 and automatically construct an MT521 message using the data elements from the MT502 and the MT518 and automatically forward the MT521 message to Company A's clearing agent 103 in Hong Kong and to Company A's local clearing agent 104 in the Philippines. Company B will receive an MT523. Company A will also receive the MT518.

System Architecture

Figure 5:
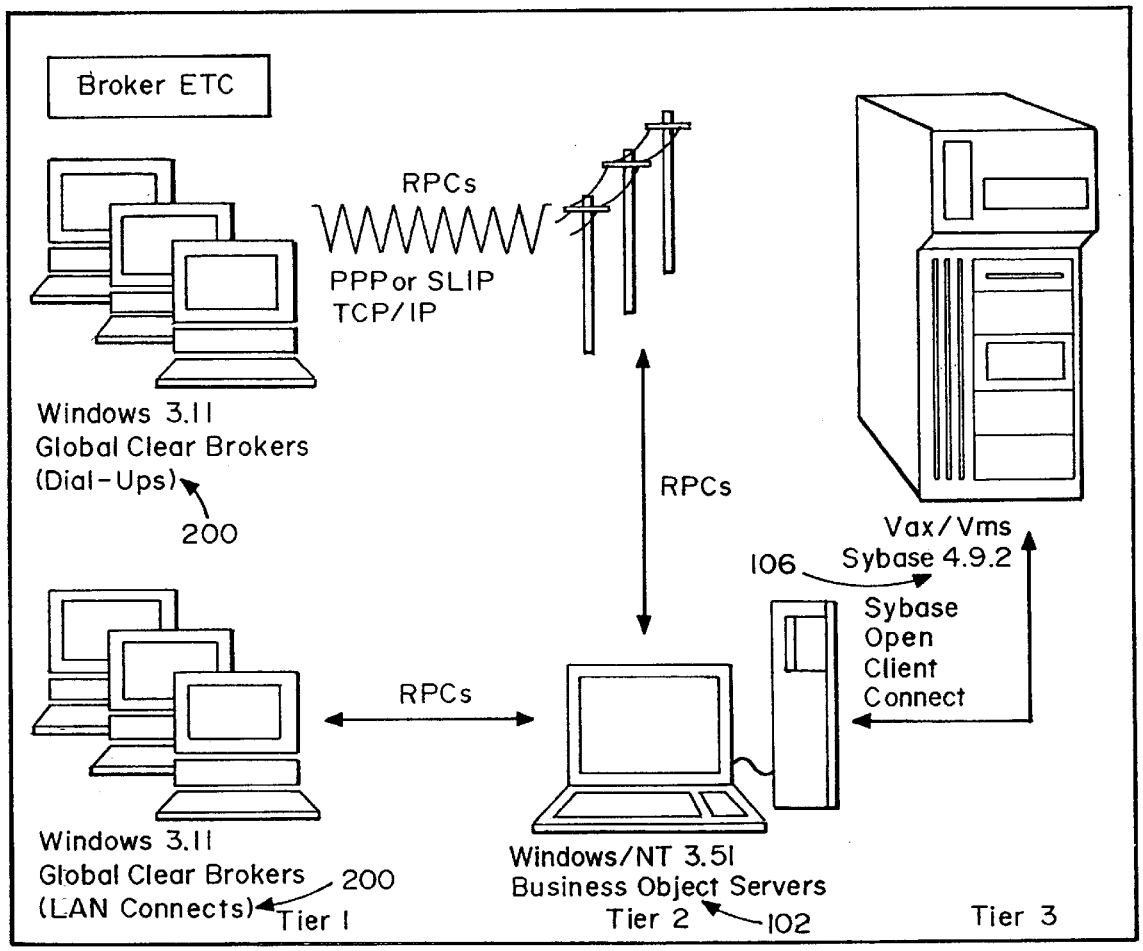
FIG. 5 depicts one embodiment of the system of the present invention.

FIG. 5 depicts the architecture of the system of the present invention. Each broker 100, 101 has an identical workstation 200. Each of these workstations can connect to the host 102 either via modem or local area network (LAN). The host 102 is connected to the database 106. The workstations 200 execute an application program that present various graphical user interfaces to the system to the brokers.

Workstation

The workstation 200 consists of a PC compatible computer, such as an IBM PC 486™ or higher. The PC is programmed to present a graphical user interface (GUI) by which the broker can connect to the host, and format and send a buy or sell message in an MT502 format to the host 102. In addition, the GUI permits the broker to connect to the host, and download MT502 messages from other brokers intended for him or her. The GUI also permits the brokers to modify their standing delivery instructions that are stored in the database 106, and which get appended to the messages. However, both the originating broker and the executing broker can manually override the standing delivery instructions stored in the database by entering settlement data on the MT502 and MT518 messages.

One possible embodiment of the operating system for the workstation is MICROSOFT WINDOWS™ operating system version 3.1x running MS/VISUAL BASIC™ software version 3.0, or WINDOWS/NT™ operating system running MS/VISUAL BASIC™ software under 16 bits.

Database

One possible embodiment of the database consists of a VAX/VMS™ operating system running SYBASE™ software version 4.92, for example. Another possible embodiment consists of a WINDOWS/NT™ operating system version 3.51 running SYBASE SYSTEM 11™ software.

Host

One possible embodiment of the host consists of a PC operating under WINDOWS/NT™ operating system version 3.51, with an ANSI-C VISUAL C++™ version 2.0 software compiler. The developers package and runtime DLL for this is ENTERA™ operating system version 3.1 for WINDOWS NT™ 3.51 software version.

The Broker to Broker Matching Electronic Trading Confirmation system uses messaging formats developed by the Society for Worldwide Interbank Financial Telecommunications, SWIFT, making it an efficient communication and trade confirmation system compatible with SWIFT messages standards and the SWIFT financial network.

The host also has the ability to generate a message asynchronously to a receiving party via SWIFT or any other data network without the user having to solicit the host. This is accomplished by using a distributed computing environment where a user's workstation acts as both a client and a server. The central host server contains a remote procedure call that creates and generates an unsolicited message to the user's workstation.

System Layers

Figure 6:
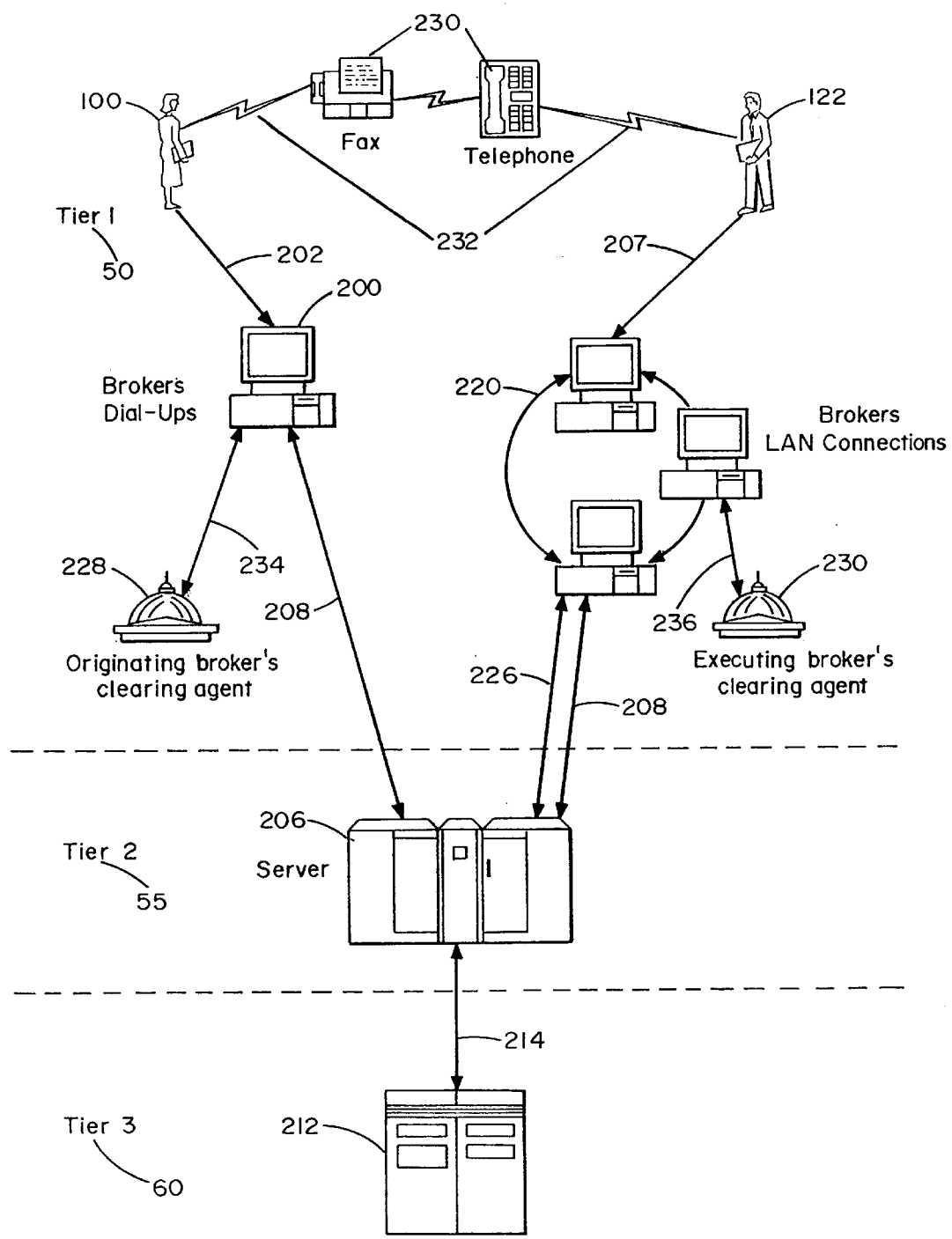
FIG. 6 depicts the overall system of the present invention in more detail.

FIG. 6 depicts the overall system in more detail. There are three tiers. Tier 1 50 includes the users and their personal computers, Tier 2 55 includes the server itself, and Tier 3 60 includes the database server.

The hardware and software for Tier 1 50 includes a client application and a graphical user interface loaded onto user's workstations or personal computers 200, 220. The users, the originating broker 100, the originating broker's clearing agent 228, the executing broker 122, and the executing broker's clearing agent 230, are connected to the server 206 via these personal computers 200, 220.

The personal computers 200, 220, which may be configured by the users to automatically dial the host at pre-defined intervals, use multiple operating systems such as MICROSOFT WINDOWS™ operating system 3.1x or MICROSOFT WINDOWS NT™ operating system. The computers 200, 220 support multiple baud rates, such as 14.4 baud or greater, and support multiple connectivity types including dial-up public data networks like COMPUSERVE™ network and TELENET™ network, local-area network connections, LAN connections, or other remote connections.

The originating broker 100 runs the software's client software and graphical user interface on a personal computer 200, to develop an order 202 to either buy or sell securities.

This order 202 is either saved on the personal computer 200 for later transmittal or the originating broker connects to the server 206 via a modem, a transport control protocol/internet protocol, TCP/IP, or other remote connection and sends the order 202 as order 208 to the server 206.

Tier 2 55 comprises the server 206, a business object server that may run using the MICROSOFT WINDOWS NT™ operating system, VISUAL C++™ operating system, and ENTERA™ operating system version 3.1. The server 206 receives the order 208, records what time the order arrived and assigns it a reference number.

The server 206 connects to the data access database 212 in Tier 3 60 via an open client connection. The data access database 212 holds the standing delivery instructions 214 and other information about individual brokers.

The server 206 matches the originating broker's order 208 with the broker's standing delivery instructions 214 stored in the database 212. The standing delivery instructions are used by the clearing agents 228, 230 to settle the trade. Through actions described in detail below, the brokers 100 and 122 can quickly and accurately make permanent changes to the standing delivery instructions or tag a temporary standing delivery instruction to a specific order.

The originating broker's order 208, with the delivery instructions 214, is stored in the server 206 until the executing broker 122 logs into the server 206.

The executing broker 122 connects 207 to the server 206 via a modem, TCP/IP or other remote connection on a personal computer 220, which in this case is connected in a local area network, and downloads the originating broker's order 208.

The originating broker 100 may also contact the executing broker 122 directly with a buy or sell order 232 over the previous system of telephones and/or fax machines 230.

The executing broker 122 fulfills the originating broker's orders to either buy or sell securities, and then sends a confirmation message 226 to the server 206.

The server 206 matches the executing broker's confirmation 226 with the originating broker's original order 208. If the originating broker contacted the executing broker directly via the telephone and/or fax machine 230 with direct order 232, the workstation automatically writes an order to match the executing broker's confirmation 226 under direction of the broker.

If the executing broker's confirmation 226 does not match the originating broker's original order 208, the server allows the originating broker 100 to visually compare and manually match the originating broker's order 208 to the executing broker's confirmation 226.

If the executing broker and the originating broker's messages match, the system develops a message notification that the transaction was completed. This message is time stamped as to when the transaction was matched and is generated automatically via the SWIFT network or stored until the originating broker's clearing agent 228 and/or the executing broker's clearing agent 230 log into the server 206.

When the clearing agents 228, 230 log into the server, they receive message notifications 234, 236 of the transaction. When the notification is downloaded by the clearing agents, the server applies a time stamp as to the time of the download.

The message notification of the completed transaction is also sent to the executing broker. By attaching dates and tracking the flow of messages, the system allows secured trading and tracing trading activities such as the changes, additions, or deletions, made to the data.

Message Flow

Figure 7:
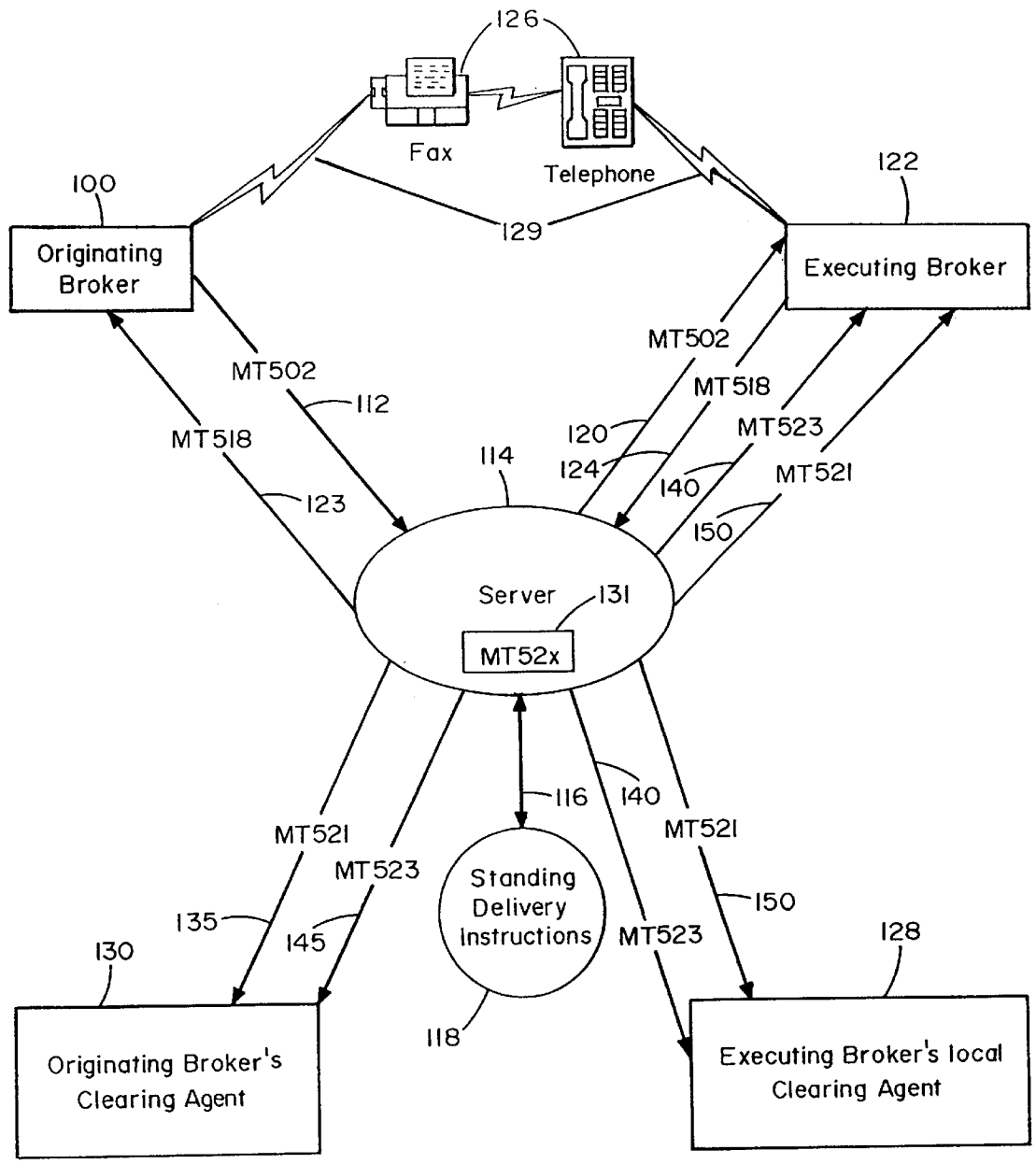
FIG. 7 depicts the flow and type of messages sent to and from the system of the present invention.

FIG. 7 depicts the flow and type of messages sent to and from the system. The originating broker 100 writes an order to either buy or sell securities 112 to the executing broker 122. This order 112 is coded according to the SWIFT securities message format as a MT502 message and sent to the server 114.

The server 114 receives the order 112, stamps it with the time received, assigns a reference number, and adds the originating broker's standing delivery instructions 116, pre-entered into a database of standing delivery instructions 118.

Standing delivery instructions 116 allow all the parties, the originating broker 100, the originating broker's clearing agent 130, the executing broker 122, and the executing broker's clearing agent 128 to monitor the status of the transaction. The standing instruction database 118 contains the standing delivery instructions 116. The standing delivery instructions are identified by the originating broker's User ED, and specifies the place of settlement, country of settlement, method of settlement, and security type.

The standing delivery instructions 116 allow the originating broker and the executing broker's clearing agents, 130 and 128, to settle the trade. The originating broker 100 and the executing broker 122 may use the standing instructions or may customize each orders' delivery instructions. To override the standard delivery instruction database 118, the originating broker 100 or the executing broker 122 enters settlement data on the MT502 orders 112 or the MT518 confirmations 124.

The server 114 saves the originating broker's MT502 buy or sell order 112 until the executing broker 122 logs into the system and downloads the order and attached delivery instructions 120.

The executing broker 122 logs into the server 114 and may display or retrieve either all open orders, all MT52x messages, or all messages to their work station. In this case, the executing broker 122 downloads orders and attached delivery instructions 120 from the server 114. The system then forwards the originating broker's order, with the attached delivery instructions, 120 to the executing broker 122. With a successful download, the server attaches a time stamp of when the message download occurred to the message 120.

The originating broker 100 may also send a buy or sell order 129 to the executing broker 122 through an alternate system, using the current system of either a telephone or a fax machine 126.

The executing broker carries out the MT502 buy or sell order 120 or 129 and develops an MT518 confirmation 124 that the order was completed. The executing broker may either save the MT518 market confirmation locally on a personal computer or send the MT518 market confirmation 124 it to the server 114 immediately.

The server 114 takes the executing broker's confirmation 124 and matches it against the originating broker's order 112. This process is conducted in the background without user intervention.

The originating broker may also use a telephone or fax to place an order 129 directly to the executing broker. When the originating broker receives the executing broker's MT518 message 124, he checks for originating broker's MT502, 112 message. When he does not find an MT502 112, he clicks on a generate button to automatically generate a buy or MT502 sell order 112. The system then automatically matches the generated order 112 to the executing broker's confirmation 124.

If the MT518 market confirmation 124 and the MT502 buy or sell orders 112 do not match, the server allows the originating broker 100 to visually compare and manually match the MT518 market confirmation 123 and the MT502 buy or sell order 112.

If the executing broker and the originating broker's messages match, the system develops a MT52x message notification 131 using the data elements from the MT502 112, the MT518 124 and the standing delivery instructions 116. This message is time stamped and stored until the clearing agent(s) 128, 130, log into the server. When the server 114 sends the MT52x message 131, it applies a time/date stamp confirming the time of download. The MT518 message 123 is also sent to the originating broker 100.

The type of MT52x 131 message notification sent to the originating broker's clearing agent 130 depends upon whether the originating broker's MT502 order 112 was a buy or a sell order.

If the MT502 message 112 was a buy order, the server constructs and sends a MT521 message 135 to the originating broker's clearing agent 130 and constructs and sends a MT523 message 140 to the executing broker 122 and the executing broker's clearing agent 128. If the MT502 message 112 was a sell order, the server constructs and sends a MT523 message 145 for the originating broker's clearing agent 130, and constructs and sends a MT521 message 150 to the executing broker 122 and the executing broker's clearing agent 128.

Graphical User Interface

Figure 8:
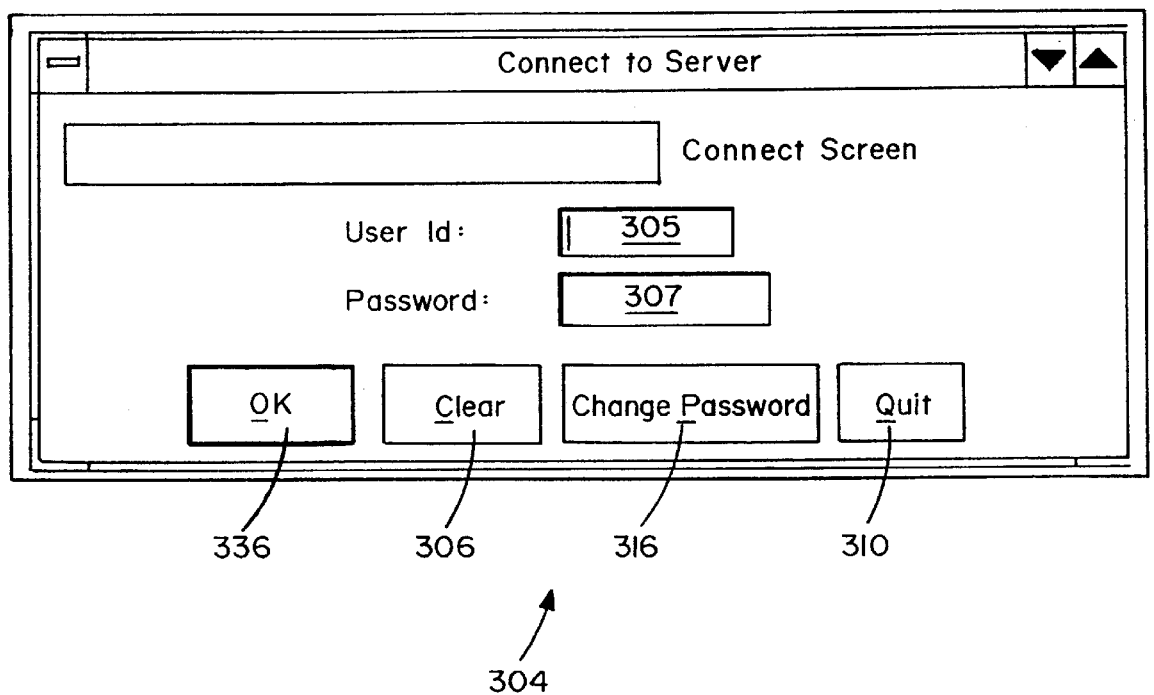
FIG. 8 is a representation of a connect screen used in the originating broker's computer in the system of the present invention.

When the broker enters the system, the broker is greeted by the connect screen 304, which is depicted in FIG. 8. This screen enables the broker to enter an identification 305 and password 307. In addition, the broker can change his password at this level by clicking on the change password button 316.

Figure 9:
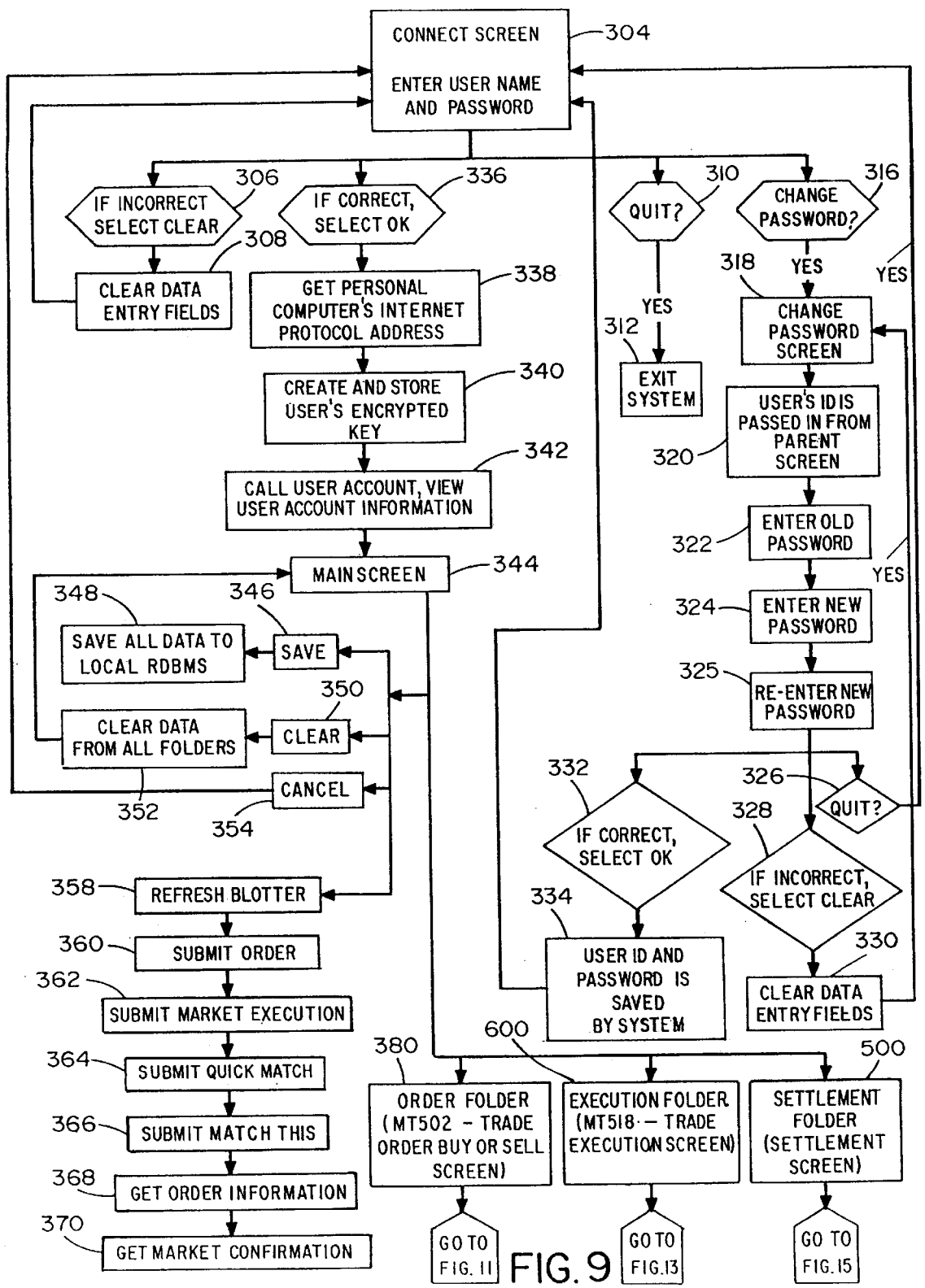
FIG. 9 diagrams how both the originating broker and the executing broker may use the system of the present invention via a graphical user interface in their computer.

FIG. 9 diagrams how both the originating broker and the executing broker may use the system via a graphical user interface according to the present invention. The originating broker may enter, maintain and cancel orders to buy or sell securities through this graphical user interface on or off-line. The executing broker may display all open orders, and enter confirmation data on the graphical user interface during on-line and off-line hours. All data is entered through pop-up and scrolling windows containing pre-defined fields and table of data where applicable.

In FIG. 9, the broker is greeted with a connect screen 304, shown in FIG. 8. The broker enters a user name 305 and password 307. If the password is incorrectly entered, the broker chooses the clear button 306, and the system clears all data fields 308 and returns the broker the connect screen 304. If the broker decides not to enter the system, the broker selects the quit button 310 and exits the system 312.

Figure 20:
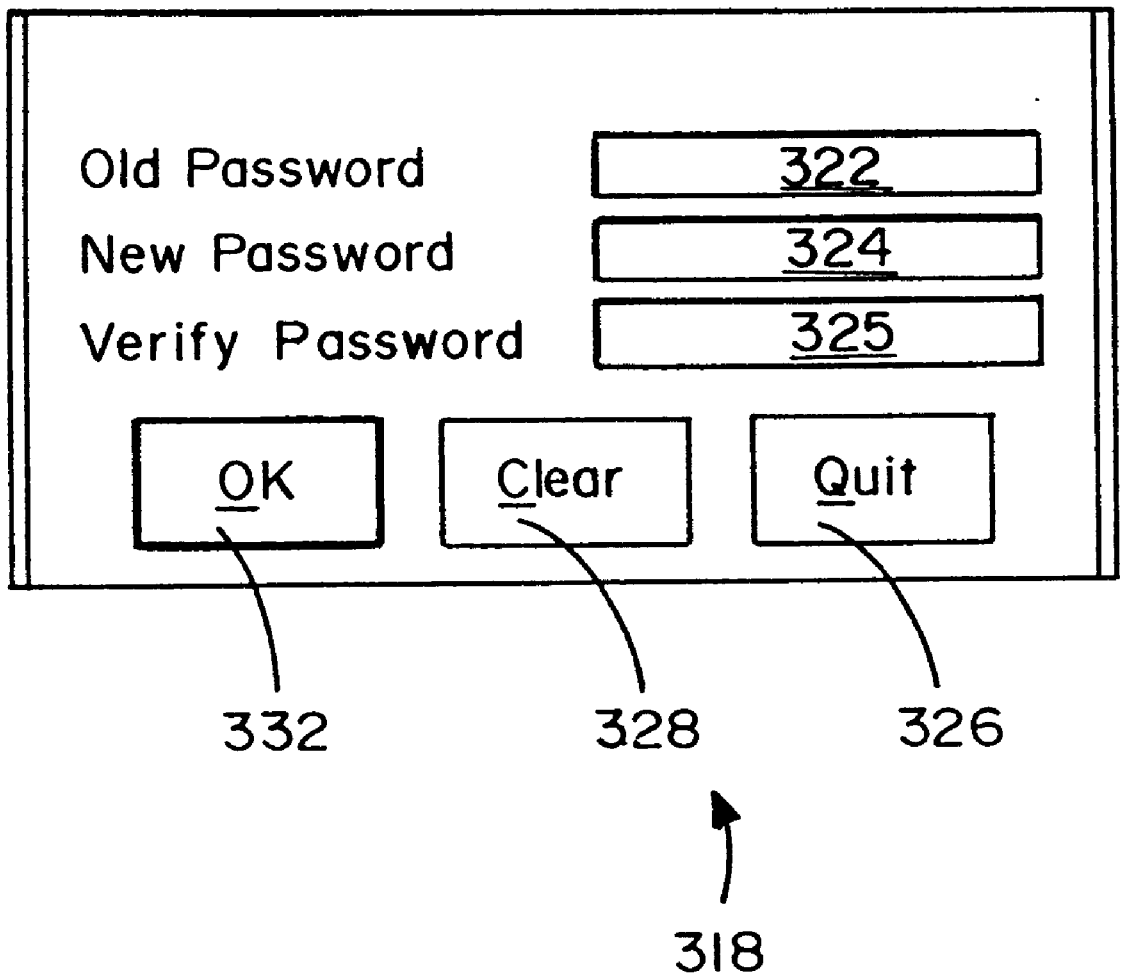
FIG. 20 depicts the change password screen used in the graphical user interface of the present invention.

If the broker elects to change the password, the broker selects the change password button 316 and the graphical user interface shows the change password screen 318 (shown in FIG. 20). The system passes the broker's User ID to this screen's data fields 320. The broker enters the old password 322 and enters the new password 324, and verifies the new password by entering it again 325. If the broker decides not to change the password, the broker selects the quit button 326 and returns to the connect screen 304. If the broker decides the password entered is incorrect, the broker selects the clear button 328. The data fields are cleared 330 and the broker is returned to the change password screen 318. If the broker decides the information is correct, the OK button is selected 332 and the User ID and new password is saved by the system 334, then the system returns to the connect screen 304.

Figure 10:
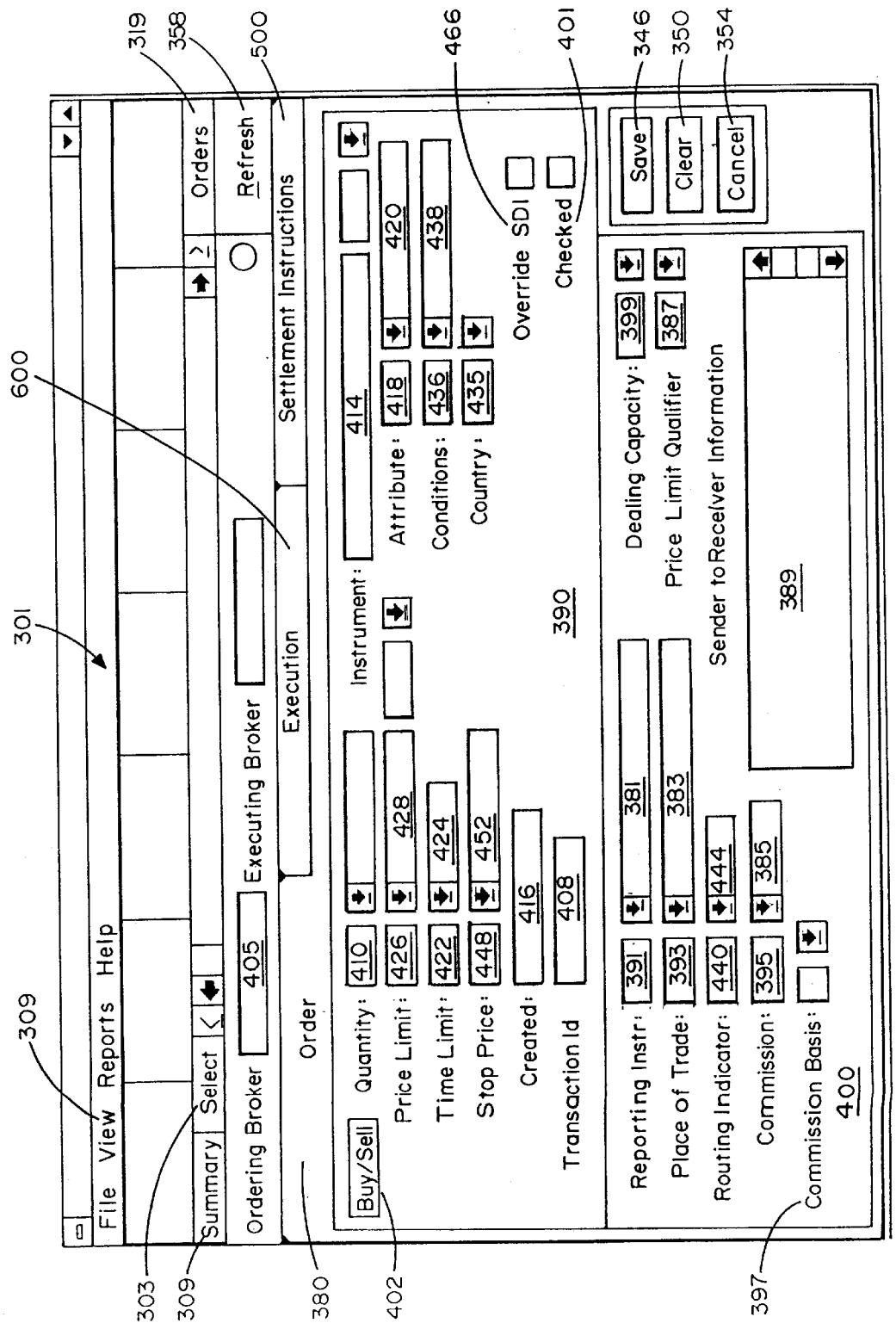
FIG. 10 represents a main screen with an order folder selected in the broker's computer in the system of the present invention.

If the broker decides the password entered at the connect screen 304 is correct, the broker selects the OK button 336. The system then assigns the personal computer an internet protocol address 338. Then it creates and stores the User's ID, password, and internet protocol address as the user's encrypted key 340. The user's account is called from the personal computer's memory, the system accesses the user's account information 342 and displays the main screen 344 (FIG. 10).

The main screen 344 consists of three folders of information (order 380, execution 600 and settlement instructions 500) and four buttons of action (Save 346, Clear 350, Cancel 354 and Refresh 358). The function of each of these is described below.

Selecting the save button 346 will save all information entered on the main screen to a local relational database management system, for example database engines provided by Oracle Corporation or Sybase Corporation 348. Selecting the clear button 350 clears all the folders of entered information 352 and returns the user to the main screen 344. Selecting the cancel button 354 returns the user to the connect screen 304. Selecting the refresh blotter button 358 causes the personal computer to submit the order 360 and the execution information 362 to the server. The server uses the quick match information 364 and matches this information 366. The server also retrieves order information 368 and gets the market confirmation 370 from the personal computer. This downloads all the orders and executions that are active on the host. Refreshing the trade blotter and the trade summary screen will send all pending trades to the host and retrieve all trades that have changed since the last time the broker accessed the host.

The folders of information in the main screen 344, described in greater detail below, are the order folder 380, the execution folder 600 and the settlement folder 500. FIG. 10 represents an embodiment of a main screen with an order folder selected.

Order Folder

Figure 11:
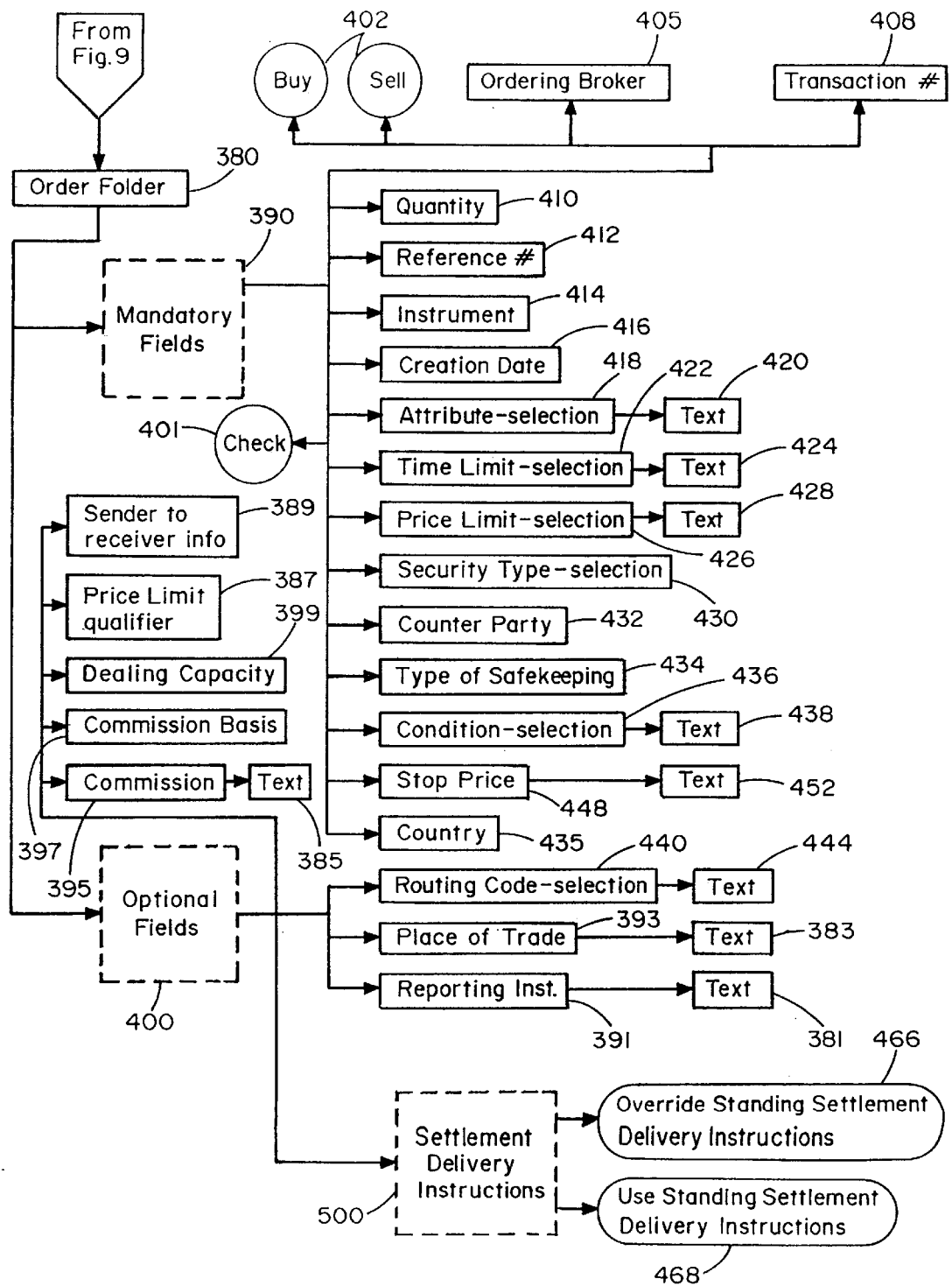
FIG. 11 describes use of the order folder contained in the main screen in the broker's computer in the system of the present invention.

FIG. 11 describes use of an embodiment of the order folder 380 contained in the main screen 344. The originating broker, who is developing an MTS02 order, enters information on the order folder 380. The order folder 380 has two categories of information, mandatory fields 390, and optional fields 400. Some mandatory fields, however, are not used depending on the type of transaction.

The mandatory fields 390 include a check-off button 401 of either buy 402 or sell 404. The originating broker selects the check button 403 to route the order, when it is sent to the server, to be checked. The ordering broker field 405 is filled in automatically by the system with the broker's alphanumeric code—pulled from the system's memory from the broker's User ID and password information entered earlier. The transaction field 408 is also filled in automatically by the system with a numeric ID specific to this particular transaction.

The broker enters the quantity of the order 410, the instrument 414, the price limit 426, the attribute 418, the time limit 422, the conditions 436, the stop price 448, and the country 435. The creation date 416 is filled in by the computer. Additional text 420, 424, 428, 438 and 452 may accompany some of these fields as shown in FIG. 10. The security type is selected 430 and the counter party 432 and the type of safekeeping 434 are entered in the settlement instructions (see FIG. 16).

The optional fields 400 let the broker to select the reporting instrument 391 with associated text 381, the place of trade 393 with associated text 383, the routing code 440 with associated text 444, the commission 395 with associated text 385, the commission basis 397, dealing capacity 399, price limit qualifier 387 and sender to receiver information 389.

Figure 15:
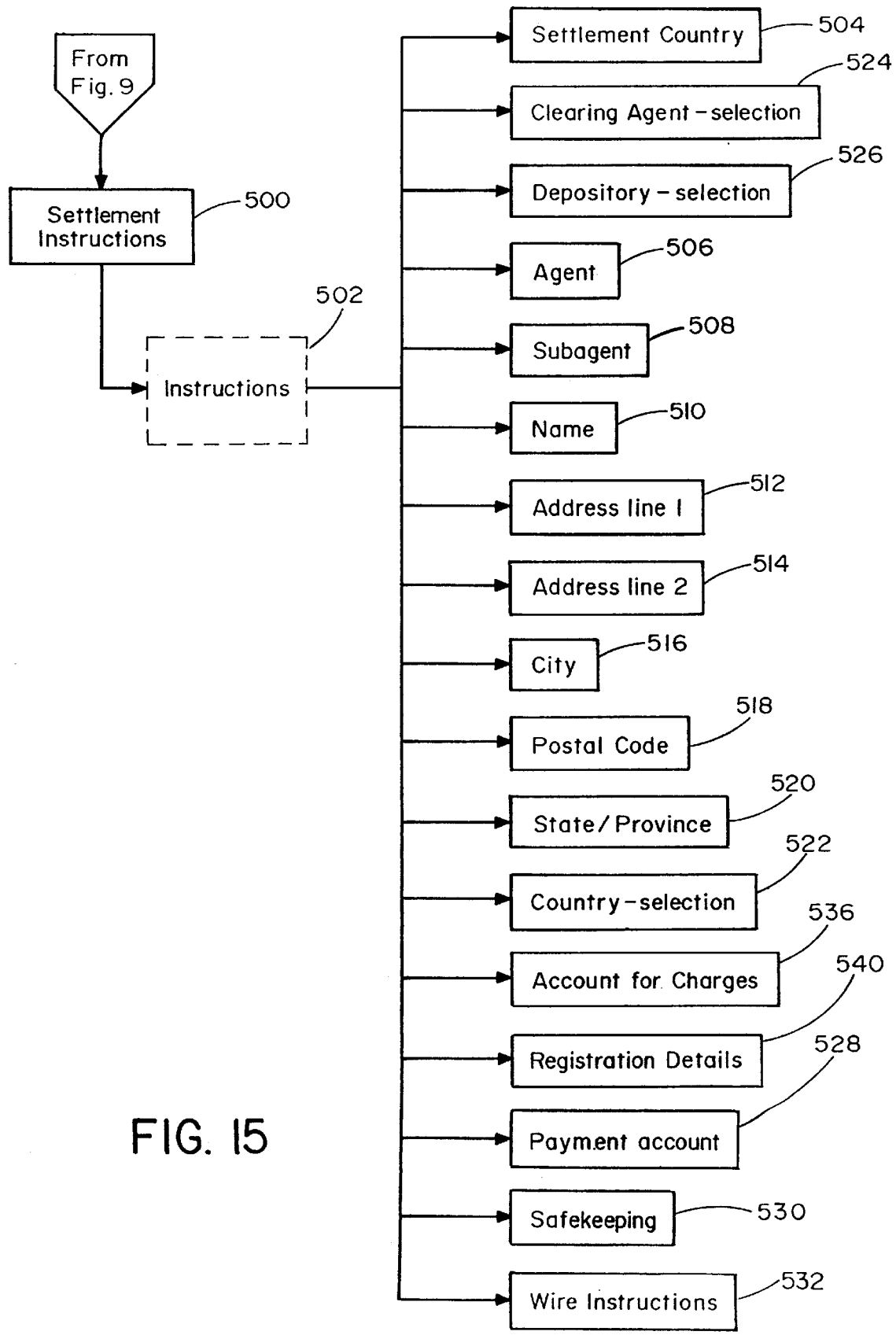
FIG. 15 describes the use of the settlement instructions folder in the broker's computer in the system of the present invention.
Figure 16:
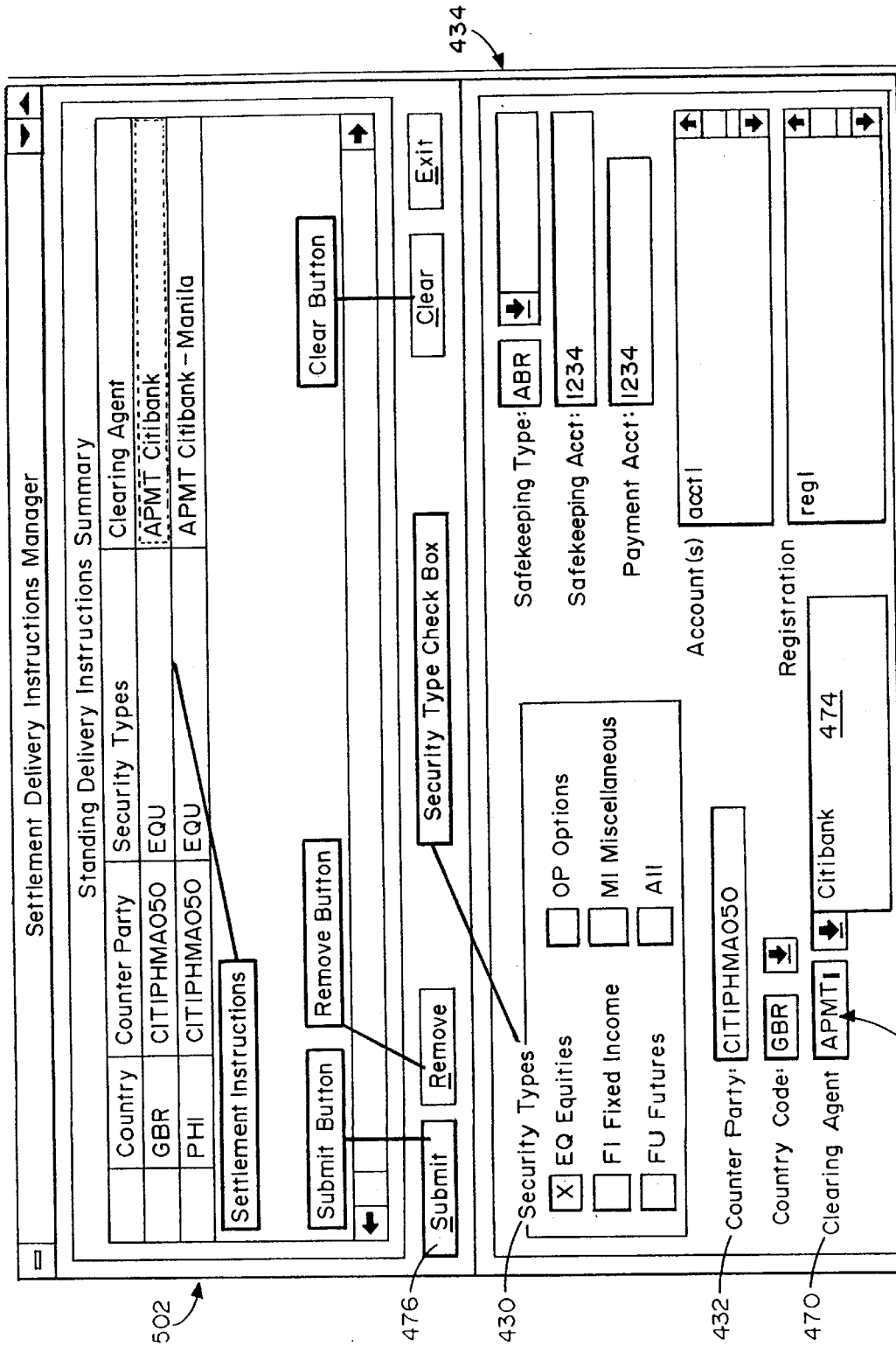
FIG. 16 represents a standing instructions manager screen in the broker's computer in the system of the present invention.

Also within the optional fields, the broker may change the settlement delivery instructions 502 by entering the settlement instructions folder 500 (FIG. 16). The broker selects a button whether to use the standing settlement delivery instructions 466, or to override the standing settlement delivery instructions 468. The settlement delivery instructions 502 are then entered on the settlement instructions folder 500 within the main menu, see FIGS. 14 and 15. The standing delivery instructions manager 800 (FIG. 16) is entered through the view menu in the main menu by selecting the standing delivery instructions in the view menu.

Execution Folder

Figure 12:
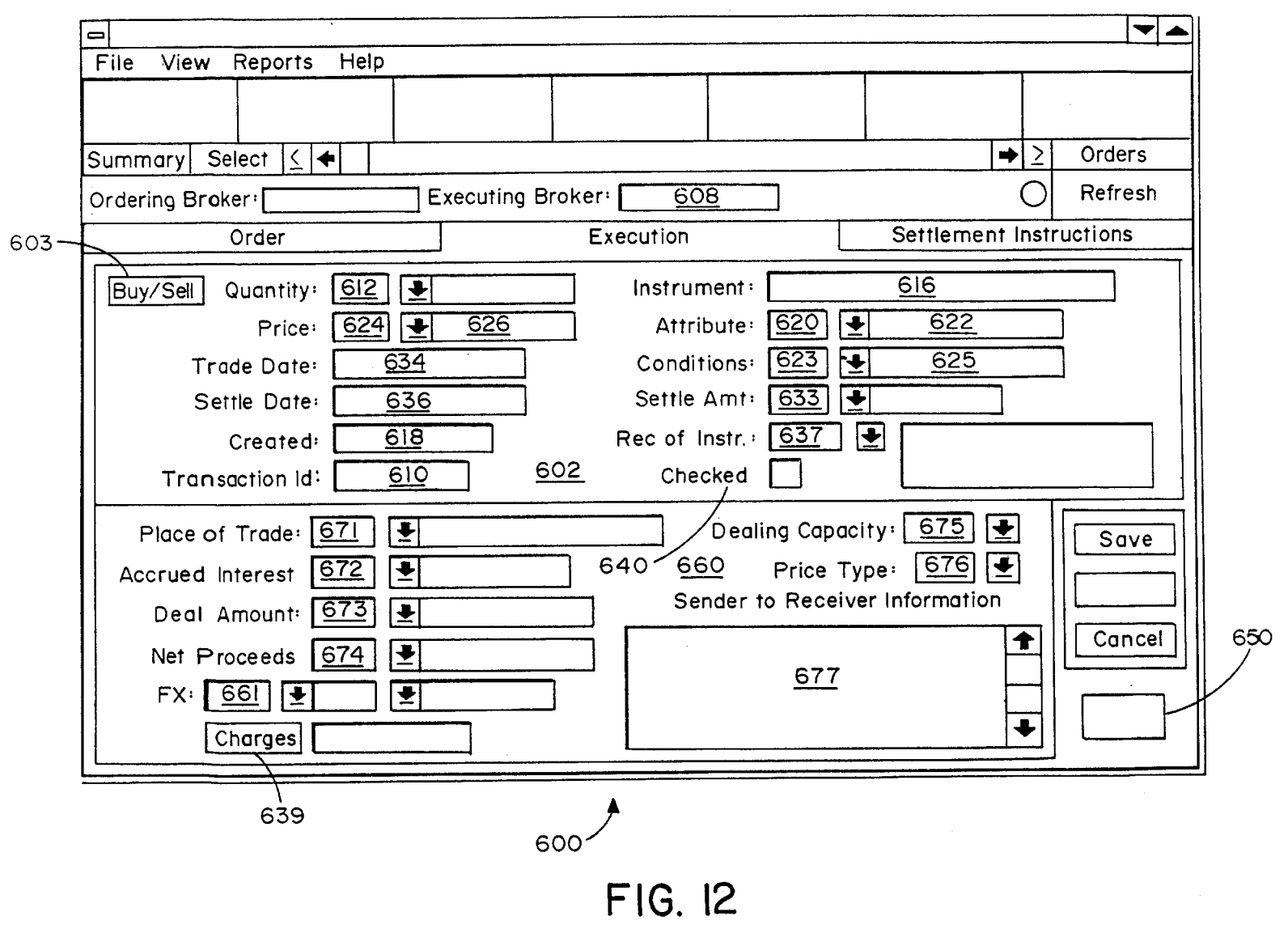
Figure 13:
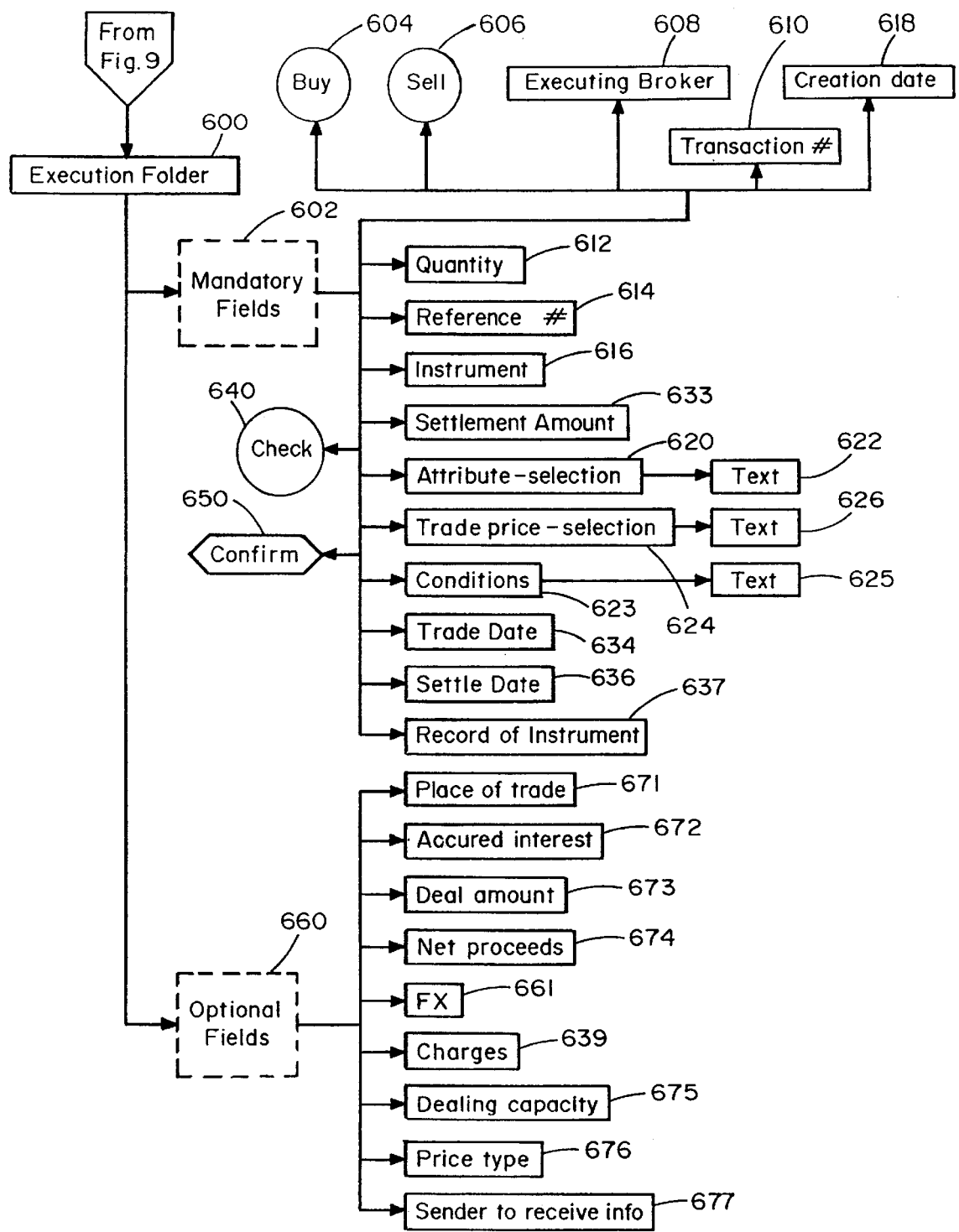
FIG. 13 describes the use of the execution folder contained in the main screen in the broker's computer in the system of the present invention.

FIGS. 12 and 13 describe the use of the execution folder 600 contained in the main screen. The execution folder 600 is used by the executing broker writing the MT518 market confirmation after fulfilling the originating broker's MT502 buy or sell order. The execution folder 600 has two types of fields, mandatory fields 602, and optional fields 660.

The mandatory field contains a check-off button 603 for either a buy 604 or a sell 606 order, similar to that in the order folder. The executing broker field 608 is filled in automatically by the system with the broker's alphanumeric code—determined by the server from the broker's User ID and password information entered earlier on the connect screen, see FIG. 9 (304). The transaction field 610 is also filled in automatically by the system with a numeric ID. The creation date 618 is filled in by the computer as to the day's current date, but this field may be changed by the executing broker.

The broker enters the quantity of the order 612, the reference number 614, the instrument 616, the price 624 and associated text 626, the attribute 620 and associated text 622, the trade date 634, the conditions 623 and associated text 625, the settle date 636, the settle amount 633, and the record of instrument 637.

The check button 640 allows the broker supervisor to authorize transmittal of orders and executions from the broker workstations. The confirm button 650 is used for quick match.

Of the optional fields 660 the broker selects the charge button 639, which displays the charge dialogue box 638 shown in FIG. 21. Among other things, the charges screen includes the tax commission 641, broker commission 642, shared commission 643, stamp duty 644, transaction tax 645, value added tax 646, withholding tax 647, postage 648, shipping 649, soft dollar 651, tax 652, transfer tax 653, the payment levy 654, SEC fees 655, matching fee 656, local tax 657, country tax 658, currency 659 and other miscellaneous fees 663.

Other optional fields include the place of trade 671, the accrued interest 672, the deal amount 673, the net proceeds 674, the FX 661, the dealing capacity 675, the price type 676 and sender to receiver information 677. When the execution currency is different from the settlement currency, the broker must specify the exchange rate on the execution screen in the FX dialogue box 661.

Settlement Instructions Folder

Figure 14:
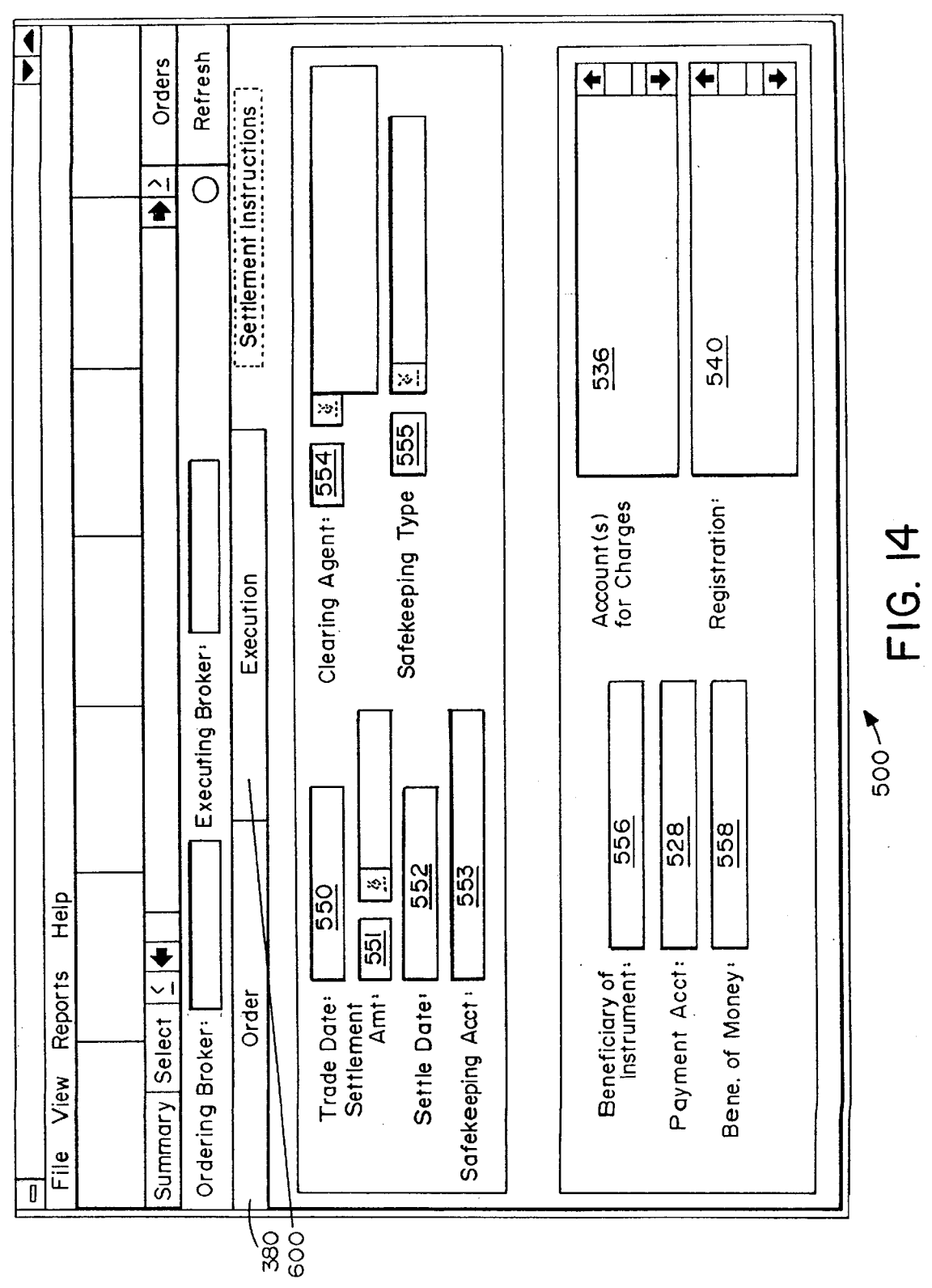

FIG. 14 represents a settlement instructions folder 500 within the main screen. This folder is entered when the ordering broker overrides the standing delivery instructions. The ordering broker can then specify the trade date 550, the settlement amount 551, the settle date 552, the safekeeping account 553, the clearing agent 554 and the safekeeping type 555 all within the settlement folder. In addition, the ordering broker can specify the beneficiary of the instrument 556, the payment account 528, the beneficiary of money 558, the account for charges 536 and the registration details 540.

FIG. 15 describes the use of the settlement instructions folder 500. The folder, titled settlement instructions 502, contains fields for the settlement country 504, the agent 506, the subagent 508, the name 510, the first 512 and second 514 lines of address, the city 516, postal code 518 and the state or province 520. The country may be selected 522, as well as the clearing agent 524, and the depository 526.

The broker may also enter the payment account 528, the safekeeping 530 and wire instructions 532 including the safekeeping account 553 and the safekeeping type 555, the account to be billed for charges 536, and registration details 540.

Standing Delivery Instructions Manager

FIG. 16 represents a standing instructions editing screen 800. This screen is entered by selecting the view button in the main menu and selecting standing instructions from the view menu. In the clearing agent box 470, the broker selects against payment (APMT) or free 472 and specifies the clearing agent in the text next 474 to the clearing agent box. Once the broker completes this screen, he clicks on the submit box 476 to enter this data into the database.

Figure 17:
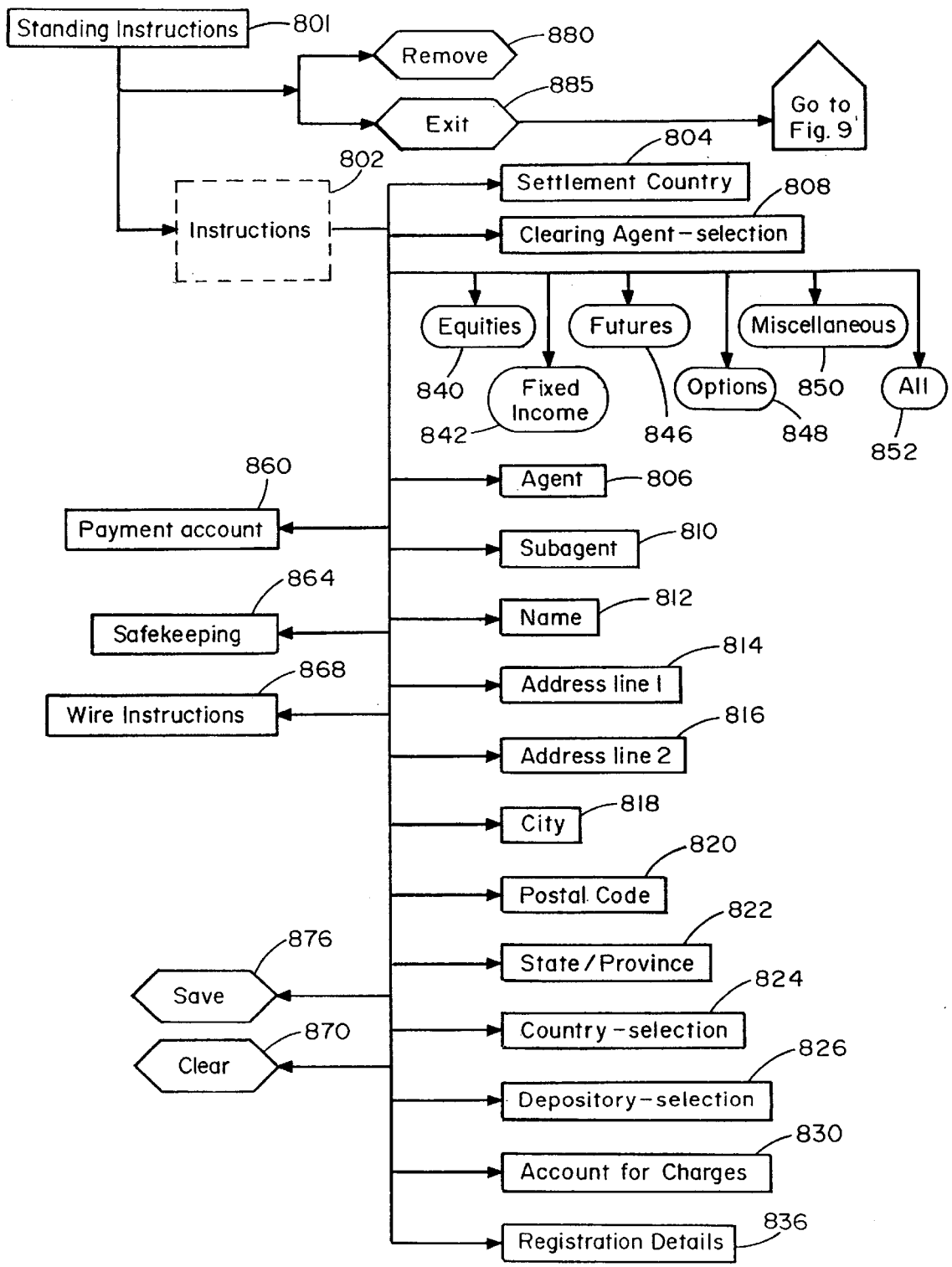
FIG. 17 describes the use of the standing instructions editing screen in the broker's computer in the system of the present invention.

FIG. 17 describes the use of a standing instructions editing screen 801. The broker enters information in the instructions section 802 of the screen. The broker chooses the clearing agent 808 enters the settlement country 804, the agent 806, the subagent 810, and the name 812, two lines of address 814, 816, the city 818, the postal code 820, and the state or province 822. The broker also selects the depository 826, the country 824 and enters the account for charges 830, and the registration details 836.

The broker may choose to check boxes on the interface to provide information to the system on whether the standing instructions are for equities 840, fixed income 842, futures 846, options 848, miscellaneous 850, or all 852.

The broker also enters the payment account 860, the safekeeping 864, and wire instructions 868 for the message. If the entered fields are incorrect, the broker selects the clear button 870 and all fields are cleared. When the instructions are entered, the broker selects the save button and the fields are saved 876 on the personal computer. When the broker logs into the server, see FIG. 6, these standing instructions are sent.

The remove button 880 clears the instructions from the screen. The exit button 885 exits the broker from the standing instructions editing screen 801 to the main screen, see FIG. 9, element 334.

Summary/Report Screen

Figure 18:
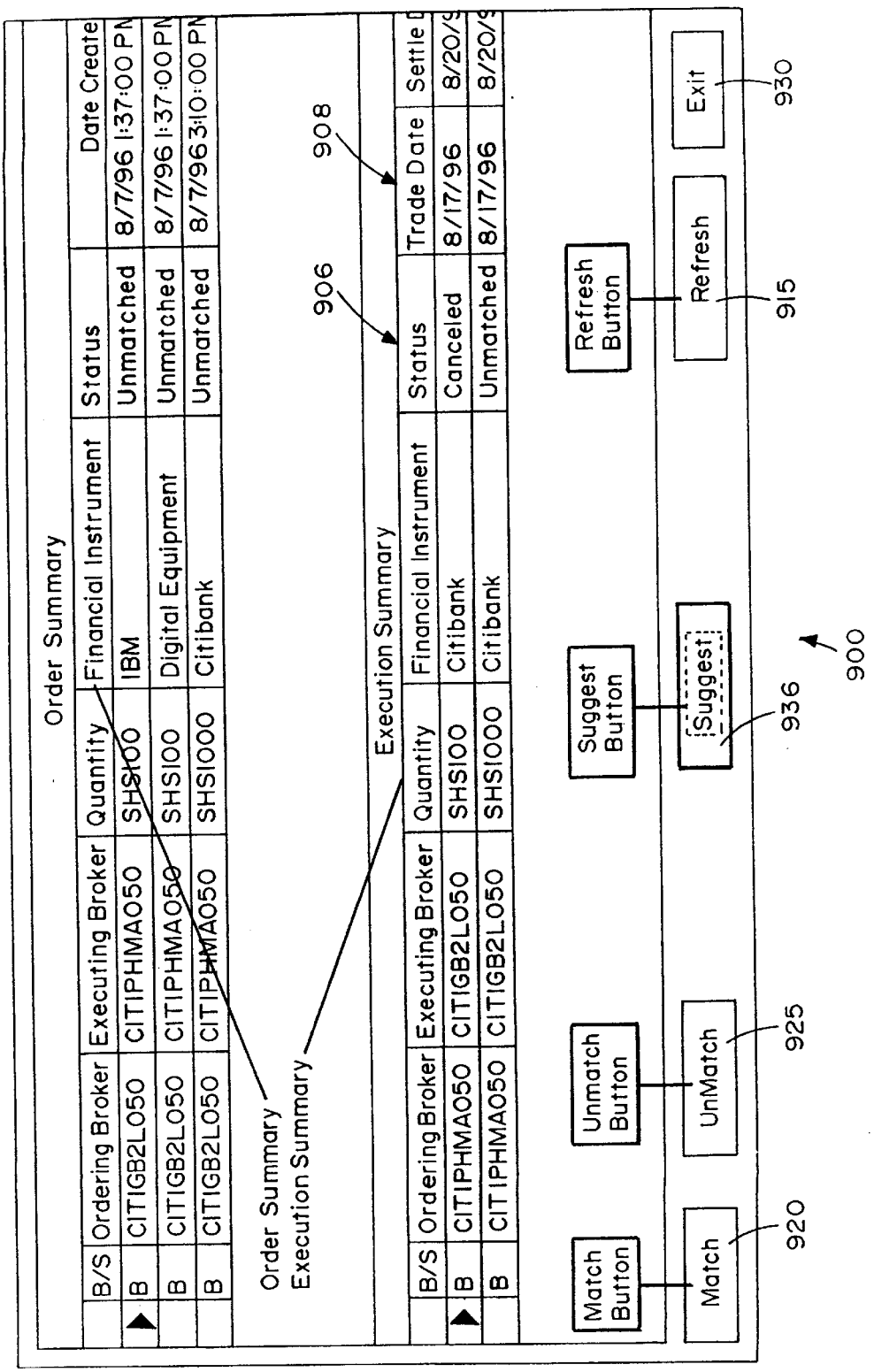
FIG. 18 represents a summary/report screen, which displays transaction information to brokers and clearing agents, in the broker's computer in the system of the present invention.

FIG. 18 represents a summary/report screen 900, which displays transaction information to brokers and clearing agents to make matching orders and executions easy. The trade summary screen is entered through the view menu on the main screen or by clicking once on the Summary button 309 on the main screen (FIG. 10).

Figure 19:
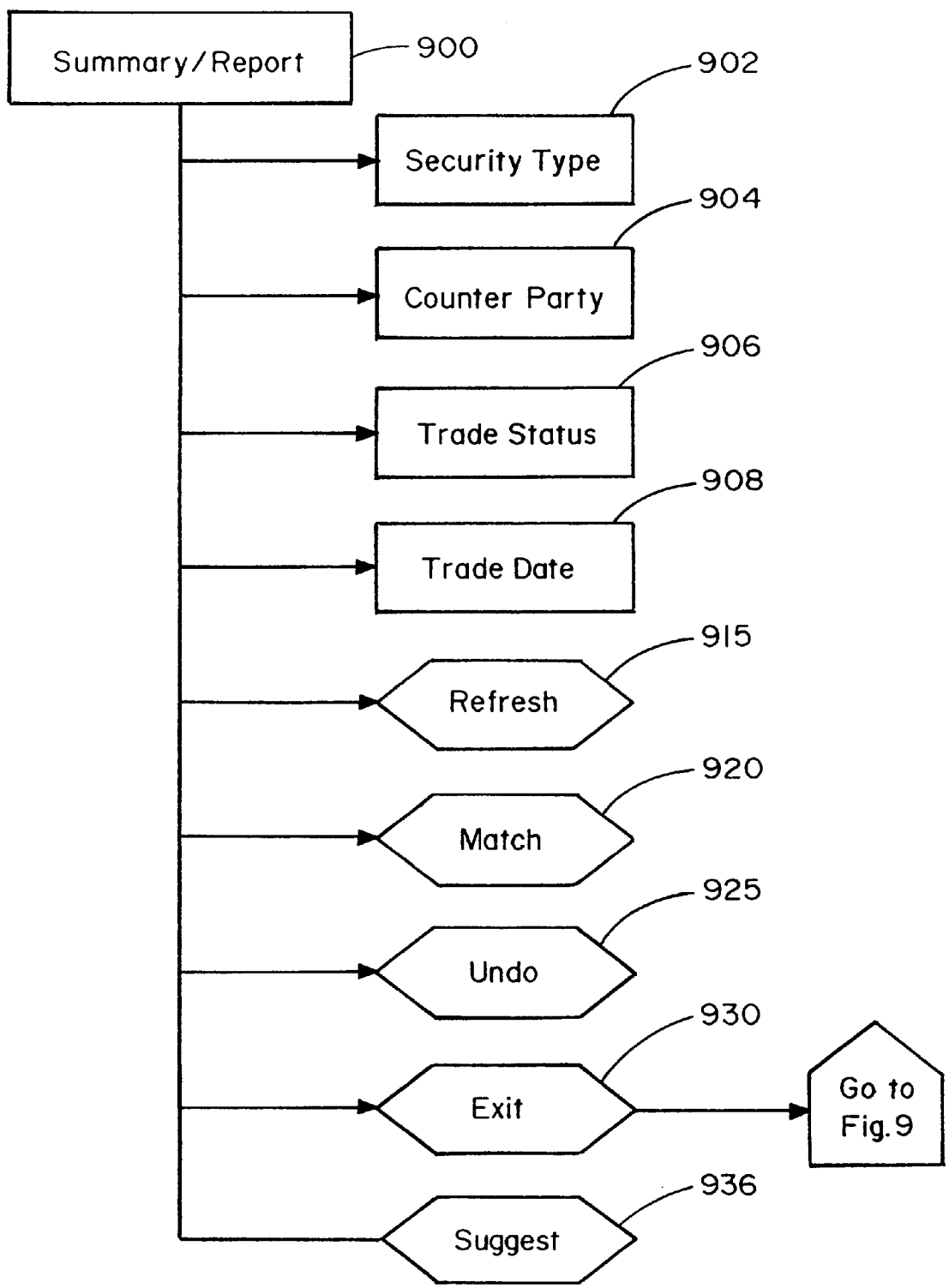
FIG. 19 describes the use of the summary/report screen in the broker's computer in the system of the present invention.

FIG. 19 describes the use of the summary/report screen 900. The security type 902, the counter party 904, trade status 906, and the trade date 908 are all displayed. If the user selects refresh 915 the personal computer logs into the server, see FIG. 6, and the information is updated.

If the broker selects the match button 920, when the screen's information is sent to the server, see Tier 2 55 on FIG. 6, the server will tie the MT502 order and MT5 18 execution messages together, set the status to matched and remove the execution confirmation from the display.

If the broker selects undo 925, the matching process is undone. If the broker selects exit 930, the screen exits to the main screen, see 344 on FIG. 9. In addition, the broker can select a suggest button to suggest a match.

Trade Blotter

Figure 22:
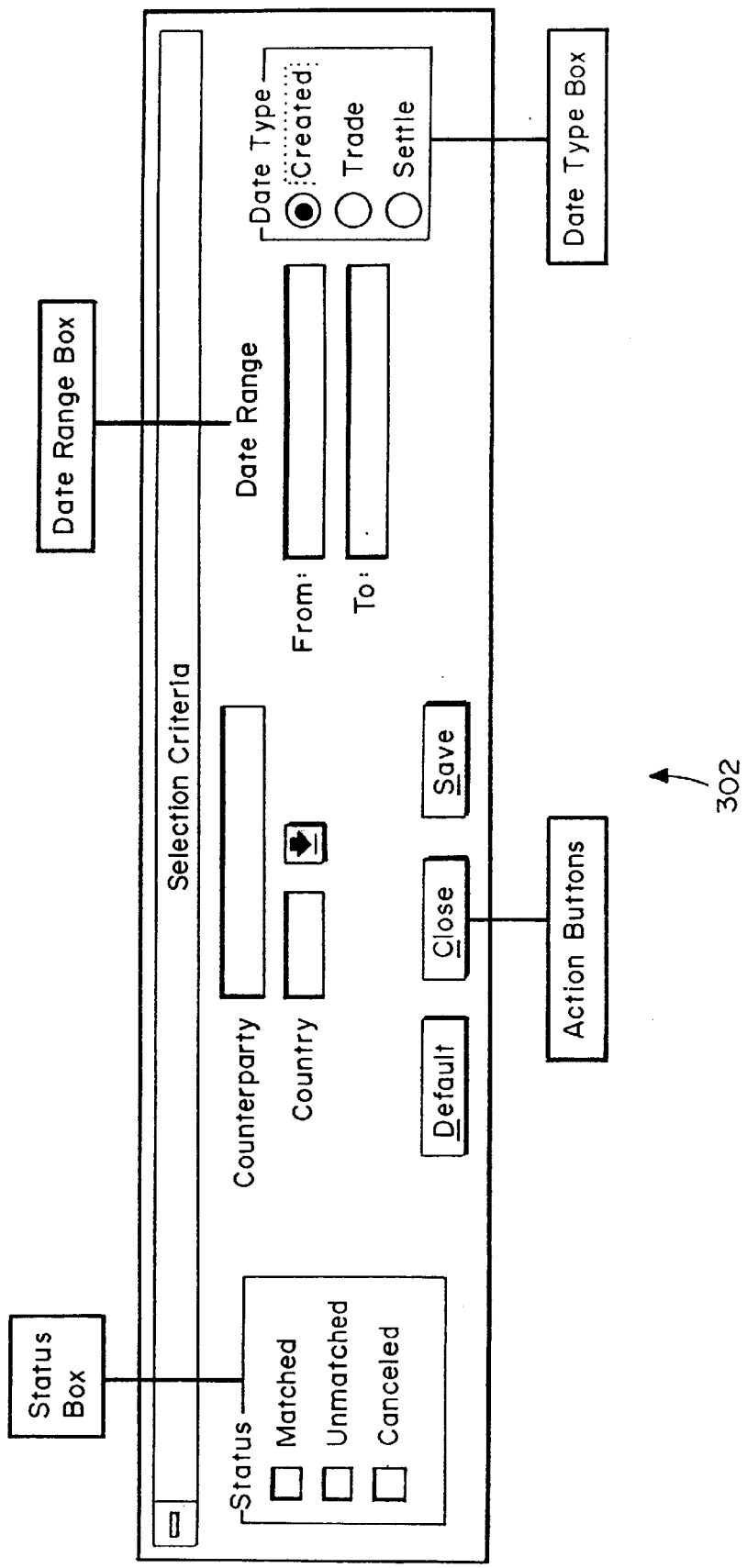
FIG. 22 depicts the selection criteria screen accessed through the main menu screen used in the graphical user interface of the present invention.
Figure 23:
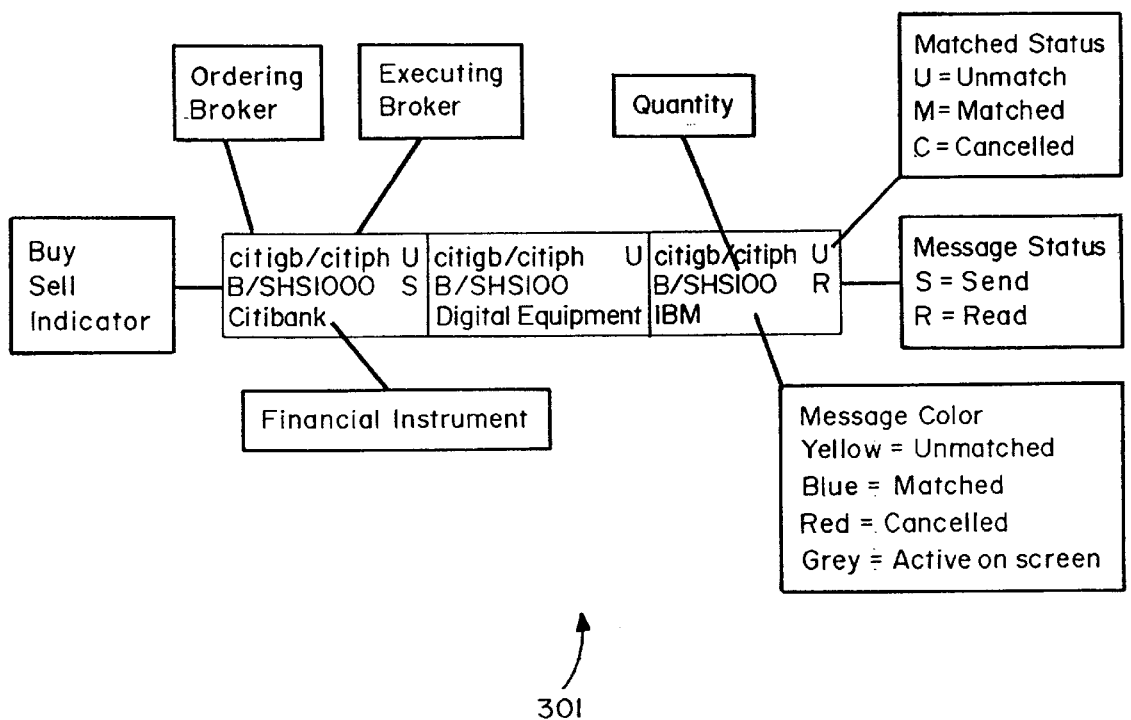
FIG. 23 depicts an example of the trade blotter used in the graphical user interface of the present invention.

In addition, the main menu 344 (FIG. 10) includes a quick summary called a trade blotter 301 at the top of the screen. By entering information in the selection criteria 302 (depicted in FIG. 22) accessed via the select button 303 (FIG. 10), the broker can view a list of trades at the top of his screen at all times. The types of trades varies depending upon the folder currently in use. The trade blotter 301 provides a quick view of the status of the orders and executions. An example of entries in the trade blotter 301 is depicted in FIG. 23. The trade blotter view can be changed by toggling between orders and executions in the order/execution button 319 in the main menu 344 (FIG. 10).

View Menu

The view menu 309 (FIG. 10) includes the following selections: audio trail, orders, executions, selection criteria, standing instructions, and trade summary. The audit trail allows the broker to view the audit trail for orders and executions. The order selection changes the trade blotter to view orders that the broker has entered and received. The executions selection changes the trade blotter to view executions that the broker has entered and received. The selection criteria changes the criteria that the broker uses to view the trade blotter and the trade summary screen. The standing instructions selection permits the broker to enter and maintain the standing delivery instructions. The trade summary selection accesses the trade summary screen.

SWIFT Formats

An order message in SWIFT format is an MT502 message. A order side confirmation message in SWIFT format is designated as MT518. A receive against payment message in SWIFT format is designated as MT521 and a deliver against payment message is designated as MT523. A receive free message in SWIFT format is designated as MT520 and a deliver free message is designated as MT522.

While the present invention has been described with respect to the existing SWIFT formats, as SWIFT is in the process of modifying these formats at the time of filing this application, it should be understood that the present invention applies to the new formats as well.

GLOSSARY

To aid the reader, the terms used herein are listed in the Glossary below with their definition.

Account for Charges

This field specifies the account(s) to be charged if it is different from the account for payment specified in the Account for Payment field.

Account for Payment

This field identifies the Ordering Broker's cash account, serviced by the Executing party and from which payment is to be made in a buy order or to which payment is to be made in a sell order.

Account with Institution

In an order to sell, this field indicates the institution to which payment is to be made in favor of the Beneficiary of Money Accrued Interest
  This field specifies the currency code and the amount of accrued interest to be added or deducted.
Attribute
  This field further defines the financial instrument by specifying an attribute. A code word may be selected form the following:
CFI—The ISO classification of the Financial Instrument Code followed by the 6 digit code.
CPD—The next coupon date followed by the date in a YYYYMMDD form.
CPN—The next coupon number followed by the number.
CTN—Certificate numbers followed by the code MSG579 (meaning a MT579 will follow.)
CUP—Covered or Uncovered Position Indicator followed by C for covered or U for uncovered.
MDC—Maturity date of the contract.
MDD—Maturity date of the Debt instrument followed by the date in the YYYYMMDD form.
MSC—Other attribute followed by a short description.
OPS—Option style followed by A for American or E for European.
OPT—Option type followed by P for Put Option or C for Call Option.
SKP—Strike price followed by the strike price.
VNO—Version number of the contract of tranche followed by the number.
Beneficiary of Financial Instruments
  This field is used to specify in a order to Buy if the financial instruments, once delivered to the Clearing Agent, are to be deposited in favor of another party or account. This field should not be used in a Sell transaction.
Beneficiary of Money
  In an order to sell, this field identifies the account to be credited with the proceeds of the sale.
Buy/Sell Indicator
  This field is used to specify if an order or execution is to Buy or Sell.
Charge Narrative
  This field is used to further explain the charges in Charges dialogue box.
Charges
  The Charges dialogue box is used to identify additional charges on the execution. Use this feature to enter Commissions, Taxes, Stamp Duty, Exchange Fees, Postage, Shipping Fees, and any other additional charges.
Clearing Agent
  This field is used to identify both the type of clearing arrangement and the settlement agent used for clearing transactions in the country specified in the Country Code. One of the following codes must be specified:
APMT—Delivery is made against payment.
FREE—Delivery is made free.
Commission
  This field specifies the commission agreed between the ordering broker and the executing party.
Commission Basis
  This field specifies the basis for the commission indicated in the commission field. One of the following codes can be selected:
P—The commission is per unit of the financial instrument.
F—The commission is a flat fee.
O—The commission is a percentage of the broker's commission.
Conditions
  This field specifies an additional transaction or trade condition. One of the following code words may be selected:

AIB—Accrued Interest Calculation Basis.
BLK—Block Order.
BST—Best execution price indicator, followed by a Y for Yes or a N for No.
CBK—Commission Sharing Broker.
CBN—Trade executed Cum Bonus.
CCP—Trade executed Cum Coupon.
CDV—Trade executed Cum Dividend.
CRS—Cross Trade Indicator, followed by Y for Yes or N for No.
CSA—Commission Sharing Account.
CSB—Commission Sharing Basis.
FRC—Free Clean Settlement.
GDL—Trade executed with guarantee delivery.
MSC—Miscellaneous.
NTP—Net Price.
POS—Position.
SDL—Trade executed with a special delivery.
SDT—Requested Settlement Date.
SEM—Trade executed by a stock exchange member
SLC—Trade executed in a special location.
SRO—Trade executed under rules of the Self Regulatory Organization.
XBN—Trade executed Ex Bonus.
XCP—Trade executed Ex Coupon.
XDV—Trade executed Ex Dividend.
Counterparty
  This field specifies the trade counterparty of the Ordering Broker.
Country
  This field identifies the country where settlement of the transaction will occur. The ordering broker must specify the two character ISO country code on the order.
Country Code
  This field is used to specify the country where settlement is to occur. The two character ISO Country Code must be entered.
Created
  The date the order or execution was created.
Deal Amount
  This field specifies the ISO currency code and the total amount of the deal. It is equal to the execution Price multiplied by the quantity of financial instruments.
Dealing Capacity
  This field identifies the role of the executing party. The following code words may be selected:
AGEN—The Executing Broker acted as an agent.
CROS—The Executing Broker executed both sides of the trade.
PRIN—The Executing Broker acted as principal.
Executing Broker
  This field indicates the executing party to which an order has been submitted or executed.
Instrument
  This field identifies the financial instrument in the transaction. An ISIN identifier should be used when available.
Net Proceeds
  This field specifies the ISO currency code and net amount after charges/taxes to be credited to the seller.
Ordering Broker
  This field indicates the initiator of an order to buy or sell securities.
Place of Trade
  This field indicates where the order is to be executed. One of the following codes may be selected:
OTC—Over the Counter
PRM—Primary Market EXC—Stock Exchange
MSC—Other place of trade
Price
  This field specifies the ISO currency code and the price of the deal as executed.
Price Limit
  This field specifies the currency, price limit and code identifying the type of order. The field consists of an ISO currency code, a price and a price limit code.
Price Limit Codes
  The following are codes used to buy or sell orders:
AON—All or none.
BCE—Buy contra short exempt.
BCS—Buy contra short.
BMI—Buy minus.
CAR—Carefully
COM—Combination order.
DNI—Do not increase.
DNR—Do not reduce.
DSC—Discretionary.
FOK—Fill or kill.
LMT—Limit order.
LWO—Limit with or without a round lot sale.
MIT—Market until touched.
MKT—At the market
MNH—Market not held.
MSC—Miscellaneous.
NHD—Not held.
ORL—Order lie.
SEI—Sell short exempt.
SLO—Stop loss.
SPS—Sell plus.
SSI—Sell short.
STL—Stop limit.
STP—Stop order.
Price Limit Qualifier
  This field is used to specify whether the price limit used in the Price Limit filed and or the Stop Price is a discount or premium amount or a par value. The following code words may be selected:
CEN—The price or stop limit is less than a dollar.
DIS—The price or stop price limit is a discount amount or percentage relative to the issue price.
PAR—The price or stop price limit is a par value or equal to the nominal or face value of the instrument.
PRE—The price or stop price limit is a premium amount or percentage relative to the issue price.
Price Type
  This field is used to specify if the price is a discount or premium amount or another type of price. One of the following codes may be used:
CEN—The price is less than a dollar.
DIS—The price is a discount or percentage relative to the issue price.
PRE—The price is a premium amount or percentage to the issue price.
PAR—The price is a par value or equal to the nominal or face value of the instrument.
Quantity
  This field specifies the quantity of the financial instrument in the trade. The following codes have been supplied to identify the type of instrument traded:
BON—Bonds
CER—Representative Certificates
CPN—Coupons
FMT—Face Amount
MSC—Miscellaneous
OPC—Option Contracts
OPS—Option Shares
PRC—Premium Contracts
PRS—Premium Shares
RTE—Rentes
RTS—Rights
SHS—Shares
UNT—Units
WTS—Warrants
Receiver/Deliverer of Financial Instruments
  This field is used to identify the party to which to be ultimately delivered or which holds the financial instruments when other than the executing party. One of the following codes must be specified:
APMT—Delivery is made against payment.
FREE—Delivery is made free.
Registration Details
  This field identifies the party whose name the financial instruments are to be registered. This field may also contain the instruction not to re-register.
Reporting Instruction
  This field is used to specify a reporting or processing instruction. One of the following codes may be used:
DDO—Directed Order.
DOR—Direct Order.
Routing Indicator
  This field indicates whether the order is to be routed to an order routing application or to a specific party. The following code words may be selected:
AOR—Used to direct an order to an Automatic Order Routing service.
ATT—Used to direct the order to attention of a specific party.
Safekeeping Account
  This field identifies the Ordering Broker's safekeeping account serviced by the executing party.
Safekeeping Type
  This field identifies the type of safekeeping. One of the following codes may be selected:
ABR—The financial instruments are held abroad.
CEN—Centralized domestic book-entry.
MSC—Other type of safekeeping, followed by a short description.
PHY—Physical domestic Safekeeping.
Security Type
  The security type that is designated on the Order to identify the type of financial instrument is used in conjunction with the country to retrieve the corresponding settlement instructions from the Standing Delivery Instructions Database. One of the following codes must be entered on the order:
EQU—Equity
FIN—Fixed Income.
FUT—Futures.
MIS—Miscellaneous.
OPT—Options.
Sender to Receiver Information
  This field is used to supply additional information and is to be used only when no other field is available for this information.
Settlement Amount
  This field specifies the ISO currency code and the total amount of money to be received in exchange for the financial instruments.
Settlement Date
  This field specifies that date on which the financial instruments and fluids are to be exchanged. Optionally, this field may be used to indicate that settlement will take place at another specified place or date. If this is the case, then one of the following codes may be used:
WIS—When Issued.
WDS—When Distributed.
WID—When Issued/When Distributed.
SOP—Seller's Option
Standing Instructions Override Indicator Checking this box indicates that standing instructions contained in the Standing Instructions Database are to be overridden.

Status Codes

This field identifies the status of an order or execution. The following three status codes exist:
CANCELED—indicates that the order or execution has been canceled.
MATCHED—Indicates that an order has been matched to an execution.
UNMATCHED—Indicates that an order or execution has not been matched by its counter party.

Stop Price

This field is used when a price limit has been specified in the Price Limit field. The following code words may be selected:
PCT—Followed by the percentage price.
REN—Followed by a revenue amount.
YLD—Followed by a yield price.

Time Limit

This field contains a code indicating the time limit or the date on which the Order is to expire; or both. One of the code words may be selected:
CLO—At the closing.
DAY—Good for the day.
GTC—Good until canceled.
GTE—Good until executed.
GTM—Good for the month.
GTD—Good through a date.
GTX—Good until crossed.
IOC—Immediate or cancel.
OPN—At the open.

Trade Date

This field indicates the date on which the order was executed.

What is claimed is:

1. A system for transmitting electronic information for trading securities among brokers in a securities transaction, comprising:

a database, the database storing standing delivery instructions relating to at least a first broker;

a data communication device for at least receiving an order message in a secure financial network format from the first broker, wherein the order message comprise a buy order or a sell order for trading securities, forwarding the order message in the secure financial network format to a second broker, receiving a confirmation message verifying execution of the order message in the secure financial network format from the second broker and forwarding the confirmation message in the secure financial network format to the first broker, forwarding a first notification message in the secure financial network format to a first clearing agent, and forwarding a second notification message in the secure financial network format to a second clearing agent, wherein the first and second notification messages comprise settlement instructions for settling the transaction; and a processor coupled to the data communication device and the database, the processor for automatically constructing the first notification message in the secure financial network format using data elements from the corresponding order and confirmation messages and the corresponding stored standing delivery instructions, and automatically constructing the second notification message in the secure financial network format using data elements from the corresponding order and confirmation messages and the corresponding stored standing delivery instructions.

2. A system as recited in claim 1, further comprising the processor for accessing the database and retreiving the stored standing delivery instructions corresponding to the order message from the first broker and appending the retrieved standing delivery instructions to the order message, and the data communication device for forwarding the appended standing delivery instructions along with the order message to the second broker.

3. A system as recited in claim 1, further comprising:

a public network in communication with the data communication device, wherein the public network is adapted for transmission of at least one message selected from the group consisting of the order message, the confirmation message, the first notification message and the second notification message; and a secure financial network in communication with the data communication device, wherein the secure financial network is adapted for transmission of at least one message selected from the group consisting of the order message, the confirmation message, the first notification message and the second notification message.

4. A system for electronically trading securities, the system being compatible with a secure financial network, comprising:

a database storing standing delivery instructions relating to at least a first broker, a second broker, a first clearing agent and a second clearing agent;

a server, the server including:

a data communication device for receiving an order message in a secure financial network format from the first broker and forwarding the order message in the secure financial network format to the second broker, receiving a confirmation message in the secure financial network format from the second broker and forwarding the confirmation messages in the secure financial network format to the first broker, forwarding a first notification message in the secure financial network format to the first clearing agent, forwarding a second notification message in the secure financial network format to the second clearing agent, wherein the server stores the order, confirmation and notification messages until retrieved by an appropriate recipient; and a processor coupled to the data communication device and the database, the processor for matching the order message with the confirmation message, preparing the first notification message in the secure financial network format using data elements from the order and confirmation messages and the stored standing delivery instructions, preparing a second notification message in the secure financial network format using data elements from the order and confirmation messages and the stored standing delivery instructions;

at least two broker workstations, each broker workstation including:

a data communication device coupled to the data communication device of the server, the data communication device for transmitting and receiving the order message in the secure financial network format, transmitting and receiving the confirmation message in the secure financial network format, and receiving the notification message in the secure financial network format;

a first graphical user interface for receiving from the first broker the order message to buy or sell securities and for directing the order message to the second broker;

a second graphical user interface for receiving from the second broker the confirmation message indicating that the order message was executed and for directing the confirmation message to the first broker; and a third graphical user interface for receiving from either the first or second broker a set of the standing delivery instructions; and at least two clearing agent workstations, each clearing agent workstation being coupled to the server, and including a fourth graphical user interface for receiving from the respective first or second clearing agent a connection request to the server and downloading the respective first or second notification message.

5. The system according to claim 4, wherein the first and second graphical user interfaces include formats for permitting a broker to override the standing delivery instructions.

6. The system according to claim 4, wherein the broker workstations automatically dial the server at pre-defined intervals.

7. The system according to claim 4, wherein the server further comprises means, when the clearing agent logs into the server, for sending the clearing agent the notification message of the transaction, and applying a time stamp indicating the time when the clearing agent downloads the notification message.

8. The system according to claim 4, wherein the server further comprises means for receiving the order message, means for stamping the order message with a time code, means for assigning a reference number to the order message and means for adding to the order message the first broker's standing delivery instructions.

9. The system according to claim 4, wherein the standing delivery instructions stored in the database include at least one set of data selected from the group consisting of a first broker's user identification, a second broker's user identification, a place of settlement, a country of settlement, a method of settlement, and a security type.

10. The system according to claim 4, wherein the at least two broker workstations and the server each comprise means for receiving from the first or second broker a request to override the standing delivery instructions stored in the database by receiving from the first or second broker settlement data on the order message or the confirmation message.

11. The system according to claim 4, wherein at least one of the at least two broker workstations includes:

means for receiving from the second broker the confirmation message that verifies that the order message was executed;

means for saving the confirmation message locally; and means for sending the confirmation message to the server.

12. The system according to claim 4, wherein the first graphical user interface enables receiving a password from the first broker, wherein receiving the password causes the server to assign an internet protocol address to the broker workstation used by the first broker, and to create and store a user password and internet protocol address as the user's encrypted key, each of which is stored in the broker workstation used by the first broker.

13. The system according to claim 4, wherein each broker workstation is adapted to display:

the order message having both mandatory and optional fields, wherein the mandatory fields include at least one field selected from the group consisting of quantity, reference number, instrument, creation date, time limit, price limit, security type, counter party and type of safekeeping, and wherein the optional fields include at least one field selected from the group consisting of routing code, stop price, charges and override standing delivery instructions;

the confirmation message including both mandatory and optional fields, wherein the mandatory fields include at least one field selected from the group consisting of order quantity, reference number, instrument, settlement amount, trade price, price type, security type, trade date, settle date, and counter party, and wherein the optional fields include at least one field selected from the group consisting of charge tax, charge write, charge stamp and charge confirmation; and the first and second notification messages having at least one field selected from the group consisting of settlement country, clearing agent, depository, address, account, safekeeping and wire instructions.

14. The system according to claim 4, wherein the server further comprises:

means for determining whether the order message comprises a buy order or a sell order; and means for varying the type of first and second notification messages, respectively, sent to the first and second clearing agents, respectively, depending upon whether the order message comprises the buy order or the sell order.

15. The system according to claim 14, wherein the determining means further includes:

means for constructing and sending a first type message to the first clearing agent if the order message comprises the buy order;

means for constructing and sending a second type message to the second broker and the second clearing agent if the order message comprises the buy order;

means for constructing and sending a second type message to the first clearing agent if the order message comprises the sell order;

means for constructing and sending a first type message to the second broker and the second clearing agent if the order message comprises the sell order;

wherein the first type message is the first or second notification message comprising a settlement instruction selected from the group consisting of a receive against payment message and a receive free message; and wherein the second type message is the first or second notification message comprising a settlement instruction selected from the group consisting of a deliver against payment message and a deliver free message.

16. A method for trading and settling securities in a securities transaction, comprising:

receiving an order message at a host computer, wherein the order message comprises a buy order or a sell order;

transmitting the order message from the host computer to an executing broker;

transmitting a confirmation message from the executing broker to the host computer, wherein the confirmation message verifies the execution of the order message;

automatically constructing within the host computer a notification message for settling the transaction by utilizing data elements from the order message, from the confirmation message and from a standing delivery instructions database accessible by the host computer, wherein the standing delivery instructions database includes a plurality of standing delivery instructions; and transmitting the notification message to a first clearing agent for settlement of the transaction.

17. The method of claim 16, further comprising sending the order message from a broker computer associated with an originating broker.

18. The method of claim 16, further comprising receiving the order message from the host computer at a broker computer associated with the executing broker.

19. The method of claim 16, wherein transmitting the confirmation message further comprises transmitting the confirmation message from a broker computer associated with the executing broker.

20. The method of claim 16, wherein utilizing data elements from the standing delivery instruction database comprises selecting at least one standing delivery instruction from the plurality of standing delivery instructions, wherein the at least one standing delivery instruction corresponds to the order message.

21. A method as recited in claim 16, wherein automatically constructing the notification message further comprises:

determining whether the order message comprises the buy order or the sell order; and varying a type of the notification message depending on whether the order message is the buy order or the sell order.

22. A method as recited in claim 21, further comprising:

constructing a first type of the notification message if the order message comprises the buy order, wherein the first type comprises a settlement instruction selected from the group consisting of a receive against payment message and a receive free message; and constructing a second type of the notification message if the order message comprises the sell order, wherein the second type comprises a settlement instruction selected from the group consisting of a deliver against payment message and a deliver free message.

23. The method of claim 16, wherein the host computer receives the message via a communication network.

24. The method of claim 23, wherein the communication network is selected from the group consisting of a public network and a secure financial network.

25. The method of claim 23, wherein the communication network is a SWIFT network.

26. The method of claim 16, wherein transmitting the order message to the executing broker occurs via a communication network.

27. The method of claim 26, wherein the communication network is selected from the group consisting of a public network and a secure financial network.

28. The method of claim 26, wherein the communication network is a SWIFT network.

29. The method of claim 16, wherein transmitting the confirmation message from the executing broker to the host computer occurs via a communication network.

30. The method of claim 29, wherein the communication network is selected from the group consisting of a public network and a secure financial network.

31. The method of claim 29, wherein the communication network a SWIFT network.

32. The method of claim 16, further comprising appending one standing delivery instruction from the plurality of standing delivery instructions to the order message prior to transmitting the order message to the executing broker, wherein the standing delivery instruction corresponds to the order message.

33. The method of claim 32, wherein appending the standing delivery instruction is performed by the host computer.

34. The method of claim 32, wherein receiving an order message further comprises receiving an order message and a temporary standing delivery instruction associated with the order message, wherein the temporary standing delivery instruction overrides the standing delivery instruction from the standing delivery instruction database.

35. The method of claim 34, wherein the temporary standing delivery instruction is appended to the order message by an originating broker.

36. A method for trading and settling securities in a securities transaction, comprising:

receiving a trade message at an executing broker, wherein the trade message comprises a buy order or a sell order to trade securities;

transmitting a confirmation message from an executing broker to a host computer, wherein the confirmation message verifies the execution of the trade message;

transmitting the confirmation message from the host computer to an originating broker;

automatically constructing via the host computer an originating broker order utilizing data elements of the confirmation message; and transmitting the originating broker order to the originating broker to complete the originating broker's record of the securities transaction.

37. A method for trading securities as recited in claim 36, wherein the receiving of the trade message at the executing broker is via a communication method selected from the group consisting of telephoning, faxing and e-mailing.

38. A method for trading securities as recited in claim 36, further comprising:

automatically constructing a notification message for settlement utilizing data elements from the originating broker order and the confirmation message; and transmitting the notification message to a first clearing agent for performing settlement of the securities transaction.

* * * * *